(12) United States Patent
Zhang

(10) Patent No.: US 11,956,148 B2
(45) Date of Patent: Apr. 9, 2024

(54) PACKET TRANSMISSION METHOD AND DEVICE

(71) Applicant: Huawei Technologies Co., Ltd., Shenzhen (CN)

(72) Inventor: Yongkang Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 276 days.

(21) Appl. No.: 17/469,222

(22) Filed: Sep. 8, 2021

(65) Prior Publication Data
US 2021/0409318 A1 Dec. 30, 2021

Related U.S. Application Data

(63) Continuation of application No. PCT/CN2020/078323, filed on Mar. 7, 2020.

(30) Foreign Application Priority Data

Mar. 8, 2019 (CN) .......................... 201910176371.8

(51) Int. Cl.
H04L 45/42 (2022.01)
H04L 45/00 (2022.01)
(Continued)

(52) U.S. Cl.
CPC ............ *H04L 45/42* (2013.01); *H04L 45/566* (2013.01); *H04L 45/745* (2013.01); *H04L 67/568* (2022.05)

(58) Field of Classification Search
CPC ..... H04L 45/42; H04L 45/566; H04L 45/745; H04L 67/568; H04L 67/63; H04L 69/22; G06F 16/901
See application file for complete search history.

(56) References Cited

U.S. PATENT DOCUMENTS 6,831,898 B1 12/2004 Edsall et al.
2010/0202420 A1 8/2010 Jersenius et al.
(Continued)

FOREIGN PATENT DOCUMENTS

CN 1516400 A 7/2004
CN 101005394 A 7/2007
(Continued)

OTHER PUBLICATIONS

Team, SRv6 Solution, and Chuck Tato. "Segment Routing Over IPv6 Acceleration Using Intel® FPGA Programmable Acceleration Card N3000." Feb. 19, 2020.*

(Continued)

*Primary Examiner* — John M MacIlwinen
(74) *Attorney, Agent, or Firm* — Conley Rose, P.C.

(57) ABSTRACT

A packet transmission method includes: receiving, by a first network device, a first packet sent by a previous-hop device of the first network device, where the first packet includes an SR header; generating, by the first network device, cache index information of the SR header, and storing the cache index information and the SR header; generating, by the first network device, a second packet based on the first packet, where the second packet includes the cache index information but does not include the SR header; and sending, by the first network device, the second packet to a second network device.

20 Claims, 15 Drawing Sheets

(51) Int. Cl.
  *H04L 45/745* (2022.01)
  *H04L 67/568* (2022.01)

(56) References Cited

U.S. PATENT DOCUMENTS

| | | |
|---|---|---|
| 2016/0021162 A1 | 1/2016 | Surcouf et al. |
| 2017/0244631 A1 | 8/2017 | Guichard et al. |
| 2018/0375684 A1* | 12/2018 | Filsfils ................. H04L 45/507 |
| 2019/0132221 A1* | 5/2019 | Boutros ............. H04L 12/4633 |
| 2020/0178278 A1 | 6/2020 | Zhao et al. |
| 2020/0322261 A1 | 10/2020 | Hu et al. |
| 2021/0176773 A1 | 6/2021 | Jiang |

FOREIGN PATENT DOCUMENTS

| | | |
|---|---|---|
| CN | 102984068 A | 3/2013 |
| CN | 104618447 A | 5/2015 |
| CN | 105813219 A | 7/2016 |
| CN | 106411738 A | 2/2017 |
| CN | 108023815 A | 5/2018 |
| CN | 108337157 A | 7/2018 |
| CN | 108702331 A | 10/2018 |
| CN | 108702763 A | 10/2018 |
| CN | 108809759 A | 11/2018 |
| CN | 108901049 A | 11/2018 |
| CN | 109067652 A | 12/2018 |
| CN | 109067657 A | 12/2018 |
| CN | 109392147 A | 2/2019 |

OTHER PUBLICATIONS

Clad et al. "Segment Routing for Service Chaining". draft-xuclad-spring-sr-service-chaining-01. (Year: 2018).*
Guichard et al. "Network Service Header (NSH) and Segment Routing Integration for Service Function Chaining (SFC)". draft-ietf-spring-nsh-sr-00. (Year: 2019).*
Filsfils et al. "IPv6 Segment Routing Header (SRH)—draft-ietf-6man-segment-routing-header-16". (Year: 2019).*
3rd Generation Partnership Project; Technical Specification Group Core Network and Terminals; IP Multimedia (IM) Core Network (CN) subsystem IP Multimedia Subsystem (IMS) Service Continuity; Stage 3 (Release 15), 3GPP TS 24.237 V15.3.0, Jun. 2018, 508 pages.
C. Filsfils et al, Segment Routing Architecture, Internet Engineering Task Force (IETF), RFC 8402, Jul. 2018, 32 Pages.
C. Filsfils et al, Segment Routing Policy Architecture; draft-ietf-spring-segment-routing-policy-02.txt, Spring Working Group, Oct. 22, 2018, 33 Pages.
C. Filsfils et al, SRv6 Network Programming; draft-filsfils-spring-srv6-network-programming-05, Spring, Jul. 2, 2018, 53 Pages.
J. Halpern et al, Service Function Chaining (SFC) Architecture, Internet Engineering Task Force (IETF), RFC 7665, Oct. 2015, 32 Pages.
P. Quinn et al, Network Service Header (NSH), Internet Engineering Task Force (IETF), RFC 8300, Jan. 2018, 40 Pages.
F. Clad et al, Service Programming with Segment Routing; draft-xuclad-spring-sr-service-programming-00, Spring, Jul. 2, 2018, 30 Pages.
C. Filsfils et al, IPv6 Segment Routing Header (SRH); draft-ietf-6man-segment-routing-header-14, Network Working Group, Jun. 28, 2018, 29 Pages.
S. Deering et al, Internet Protocol, Version 6 (IPv6) Specification, Internet Engineering Task Force (IETF), RFC 8200, Jul. 2017, 42 Pages.
M. Mahalingam et al, Virtual extensible Local Area Network (VXLAN): A Framework for Overlaying Virtualized Layer 2 Networks over Layer 3 Networks, Independent Submission, RFC 7348, Aug. 2014, 22 Pages.
F. Maino et al, Generic Protocol Extension for VXLAN; draft-ietf-nvo3-vxlan-gpe-06, Network Working Group, Apr. 30, 2018, 17 Pages.
J. Gross et al, Geneve: Generic Network Virtualization Encapsulation; draft-ietf-nvo3-geneve-08, Network Working Group, Oct. 7, 2018, 29 Pages.
D. Farinacci et al, Generic Routing Encapsulation (GRE), Network Working Group, RFC 2784, Mar. 2000, 9 Pages.
C. Pignataro et al, IPv6 Support for Generic Routing Encapsulation (GRE), Internet Engineering Task Force (IETF), RFC 7676, Oct. 2015, 11 Pages.
A. Conta et al, Generic Packet Tunneling in IPV6 Specification, Network Working Group, RFC 2473, Dec. 1998, 36 Pages.
J. Guichard et al, NSH and Segment Routing Integration for Service Function Chaining (SFC); draft-guichard-sfc-nsh-sr-02, SFC, Internet-Draft, Jun. 18, 2018, 15 Pages.
Guichard, J., et al., "NSH and Segment Routing Integration for Service Function Chaining (SFC)," draft-guichard-spring-nsh-sr-00, Sep. 27, 2018, 16 pages.
Clad, F., Ed., et al., "Segment Routing for Service Chaining," draft-xuclad-spring-sr-service-chaining-00, Jan. 8, 2018, 35 pages.

* cited by examiner

PACKET TRANSMISSION METHOD AND DEVICE

CROSS-REFERENCE TO RELATED APPLICATIONS

This is a continuation of Int'l Patent App. No. PCT/CN2020/078323, filed on Mar. 7, 2020, which claims priority to Chinese Patent App. No. 201910176371.8, filed on Mar. 8, 2019, both of which are incorporated by reference.

FIELD

Embodiments of this disclosure relate to the field of communications technologies, and in particular, to a packet transmission method and a device.

BACKGROUND

The Internet Engineering Task Force (IETF) service function chain (SFC) working group (WG) defines an implementation framework for an SFC. Types of network elements on an SFC data plane may include: a classifier, a service function forwarder (SFF), an SFC proxy, and a service function (SF) device.

During implementation of a segment routing (SR) SFC, if the SF does not support the SR, the SFF has to implement an SR proxy function. A packet processing procedure is as follows: When the SFF receives an SR packet from an upstream device of the SFF and needs to implement an SR dynamic proxy function, the SFF needs to remove and cache an encapsulation of an SR header before forwarding the service packet to the SF, and uses a 5-tuple of the service packet as an index of an SR header cache entry. After receiving the service packet, the SF performs related processing of a service function according to a local configuration policy and returns the service packet to the SFF. After receiving the service packet from the SF, the SFF obtains the SR header cache entry through a query based on the 5-tuple, restores encapsulation of an SR header, and forwards a re-encapsulated packet to a downstream device of the SFF.

However, when the SFF implements the SR dynamic proxy function, if the SF modifies the 5-tuple of the service packet, when the SFF receives the service packet returned by the SF, the SFF cannot use the 5-tuple to successfully obtain the SR header cache entry through a query and restore encapsulation of an SR header. Consequently, the packet fails to be forwarded.

SUMMARY

Embodiments provide a packet transmission method and a device, to successfully process an SR header of a packet, and ensure normal forwarding of a service packet.

According to a first aspect, an embodiment provides a packet transmission method, applied to a first network device. The packet transmission method may include: receiving a first packet sent by a previous-hop device of the first network device, where the first packet includes an SR header; generating cache index information of the SR header, and storing the cache index information and the SR header; generating a second packet based on the first packet, where the second packet includes the cache index information but does not include the SR header; and sending the second packet to a second network device.

According to the packet transmission method provided in the first aspect, after receiving the first packet sent by the previous-hop device of the first network device, the first network device generates the cache index information when caching the SR header included in the first packet, and uses the cache index information as an index value for caching the SR header. The first network device adds the cache index information to the second packet that is to be sent to the second network device, so that the second network device does not modify a value of the cache index information, and returns, through a response packet, the cache index information to the first network device without modification. In this way, the cache index information carried in the second packet sent by the first network device to the second network device is the same as the cache index information carried in the response packet received by the first network device from the second network device. The first network device may accurately obtain, from locally cached SR headers based on the cache index information carried in the response packet, the SR header included in the first packet, and successfully restore the SR header, thereby ensuring normal forwarding of a service packet.

Optionally, in a possible implementation of the first aspect, the cache index information is used to indicate to enable the first network device to add the cache index information to the second packet.

According to the packet transmission method provided in this possible implementation, if the second packet carries the cache index information, when the cache index information is a valid value, the cache index information indicates that the first network device is enabled to have a capability of carrying the cache index information. The cache index information may indicate an enabling capability, and represent the cache index information, thereby improving efficiency and reducing packet overheads. When the cache index information is an invalid value, the cache index information is used to indicate that the first network device is not enabled to have the capability of carrying the cache index information. It can be learned that a flexible implementation is provided to help deploy and manage a service on demand.

Optionally, in a possible implementation of the first aspect, the second packet further includes identification information, and the identification information is used to indicate to enable the first network device to add the cache index information to the second packet.

According to the packet transmission method provided in this possible implementation, if the second packet carries the identification information, when the identification information is a valid value, the identification information is used to indicate that the first network device is enabled to have the capability of carrying the cache index information. When the identification information is an invalid value, the identification information is used to indicate that the first network device is not enabled to have the capability of carrying the cache index information. A flexible implementation is provided to help deploy and manage a service on demand.

Optionally, in a possible implementation of the first aspect, the generating cache index information of the SR header may include: obtaining N-tuple information in the first packet, where the N-tuple information is used to indicate a data flow to which the first packet belongs, and N is an integer greater than 0; and generating the cache index information based on the N-tuple information.

According to the packet transmission method provided in this possible implementation, the first network device generates the cache index information based on the N-tuple information, distinguishes between different SR headers and data flows by using the cache index information, and restores encapsulation of an SR header by using the cache index information. This ensures normal forwarding of the service packet.

Optionally, in a possible implementation of the first aspect, the packet transmission method may further include: receiving a response packet that is for the second packet and that is sent by the second network device, where the response packet for the second packet includes the cache index information; obtaining, based on the cache index information, an SR header that is corresponding to the cache index information and that is stored in the first network device; generating a third packet based on the response packet for the second packet, where the third packet includes an SR header; and sending the third packet to a next-hop device of the first network device.

According to the packet transmission method provided in this possible implementation, the cache index information carried in the second packet sent by the first network device to the second network device is the same as the cache index information carried in the response packet received by the first network device from the second network device. Therefore, the first network device may successfully obtain a matched SR header through a query based on the cache index information carried in the response packet, successfully restore an SR header, generate the third packet, and send the third packet to the next-hop device of the SFF. This ensures normal forwarding of the service packet.

Optionally, in a possible implementation of the first aspect, before the obtaining, based on the cache index information, an SR header that is corresponding to the cache index information and that is stored in the first network device, the method may further include: determining whether to enable, at a current moment, the first network device to add the cache index information to the second packet; and if it is determined to enable, at the current moment, the first network device to add the cache index information to the second packet, performing the step of obtaining, based on the cache index information, an SR header that is corresponding to the cache index information and that is stored in the first network device.

According to the packet transmission method provided in this possible implementation, whether to enable, at a current moment, the first network device to add the cache index information to the second packet is determined, so that different scenarios are distinguished, and execution effectiveness in a packet forwarding process is improved.

Optionally, in a possible implementation of the first aspect, before the receiving a first packet sent by a previous-hop device of the first network device, the method may further include: obtaining configuration information, where the configuration information is used to enable the first network device to add the cache index information to the second packet.

According to the packet transmission method provided in this possible implementation, enabling can be flexibly configured, thereby improving flexibility of packet forwarding.

Optionally, in a possible implementation of the first aspect, the second packet includes a packet header, the packet header includes a content field, and the content field is used to carry the cache index information.

Optionally, in a possible implementation of the first aspect, the second packet includes a packet header, the packet header includes an identifier field, and the identifier field is used to carry the identification information.

According to a second aspect, an embodiment provides a packet transmission method, applied to a second network device. The packet transmission method may include: receiving a second packet sent by a first network device, where the second packet includes cache index information; generating a response packet based on the second packet, where the response packet includes the cache index information; and sending the response packet to the first network device.

Optionally, in a possible implementation of the second aspect, the cache index information is used to indicate to enable the second network device to add the cache index information to the response packet.

Optionally, in a possible implementation of the second aspect, the response packet further includes identification information, and the identification information is used to indicate to enable the second network device to add the cache index information to the response packet.

Optionally, in a possible implementation of the second aspect, the response packet includes a packet header, the packet header includes a content field, and the content field is used to carry the cache index information.

Optionally, in a possible implementation of the second aspect, the response packet includes a packet header, the packet header includes an identifier field, and the identifier field is used to carry the identification information.

Optionally, in a possible implementation of the second aspect, before the generating a response packet based on the second packet, the method may further include: determining whether to enable, at a current moment, the second network device to add the cache index information to the response packet; and if it is determined to enable, at the current moment, the second network device to add the cache index information to the response packet, performing the step of generating the response packet based on the second packet.

Optionally, in a possible implementation of the second aspect, the packet transmission method may further include: receiving configuration information, where the configuration information is used to enable the second network device to add the cache index information to the response packet.

According to a third aspect, an embodiment provides a network device serving as a first network device. The first network device may include: a receiving module configured to receive a first packet sent by a previous-hop device of the first network device, where the first packet includes an SR header; a processing module configured to: generate cache index information of the SR header, and store the cache index information and the SR header; and generate a second packet based on the first packet, where the second packet includes the cache index information but does not include the SR header; and a sending module configured to send the second packet to a second network device.

Optionally, in a possible implementation of the third aspect, the cache index information is used to indicate to enable the first network device to add the cache index information to the second packet.

Optionally, in a possible implementation of the third aspect, the second packet further includes identification information, and the identification information is used to indicate to enable the first network device to add the cache index information to the second packet.

Optionally, in a possible implementation of the third aspect, the processing module is further configured to: obtain N-tuple information in the first packet, where the N-tuple information is used to indicate a data flow to which the first packet belongs, and N is an integer greater than 0; and generate the cache index information based on the N-tuple information.

Optionally, in a possible implementation of the third aspect, the receiving module is further configured to receive a response packet that is for the second packet and that is sent by the second network device, where the response packet for the second packet includes the cache index information. The processing module is further configured to: obtain, based on the cache index information, an SR header that is corresponding to the cache index information and that is stored in the first network device; and generate a third packet based on the response packet for the second packet, where the third packet includes the SR header. The sending module is further configured to send the third packet to a next-hop device of the first network device.

Optionally, in a possible implementation of the third aspect, the processing module is further configured to: determine whether to enable, at a current moment, the first network device to add the cache index information to the second packet; and if it is determined to enable, at the current moment, the first network device to add the cache index information to the second packet, performing the step of obtaining, based on the cache index information, an SR header that is corresponding to the cache index information and that is stored in the first network device.

Optionally, in a possible implementation of the third aspect, the receiving module is further configured to obtain configuration information, where the configuration information is used to enable the first network device to add the cache index information to the second packet.

Optionally, in a possible implementation of the third aspect, the second packet includes a packet header, the packet header includes a content field, and the content field is used to carry the cache index information.

Optionally, in a possible implementation of the third aspect, the second packet includes a packet header, the packet header includes an identifier field, and the identifier field is used to carry the identification information.

According to a fourth aspect, an embodiment provides a network device serving as a second network device. The second network device includes: a receiving module configured to receive a second packet sent by a first network device, where the second packet includes cache index information; a processing module configured to generate a response packet based on the second packet, where the response packet includes the cache index information; and a sending module configured to send the response packet to the first network device.

Optionally, in a possible implementation of the fourth aspect, the cache index information is used to indicate to enable the second network device to add the cache index information to the response packet.

Optionally, in a possible implementation of the fourth aspect, the response packet further includes identification information, and the identification information is used to indicate to enable the second network device to add the cache index information to the response packet.

Optionally, in a possible implementation of the fourth aspect, the response packet includes a packet header, the packet header includes a content field, and the content field is used to carry the cache index information.

Optionally, in a possible implementation of the fourth aspect, the response packet includes a packet header, the packet header includes an identifier field, and the identifier field is used to carry the identification information.

Optionally, in a possible implementation of the fourth aspect, the processing module is further configured to: determine whether to enable, at a current moment, the second network device to add the cache index information to the response packet; and if it is determined to enable, at the current moment, the second network device to add the cache index information to the response packet, performing the step of generating the response packet based on the second packet.

Optionally, in a possible implementation of the fourth aspect, the receiving module is further configured to receive configuration information, where the configuration information is used to enable the second network device to add the cache index information to the response packet.

According to a fifth aspect, an embodiment provides a network device serving as a first network device. The first network device includes a processor, a memory, and a transceiver. The transceiver is configured to receive or send data. The memory is configured to store instructions. The processor is configured to execute the instructions stored in the memory, to implement the packet transmission method provided in any one of the first aspect or the implementations of the first aspect.

According to a sixth aspect, an embodiment provides a network device serving as a second network device. The second network device includes a processor, a memory, and a transceiver. The transceiver is configured to receive or send data. The memory is configured to store instructions. The processor is configured to execute the instructions stored in the memory, to implement the packet transmission method provided in any one of the second aspect or the implementations of the second aspect.

According to a seventh aspect, an embodiment provides a computer-readable storage medium. The computer-readable storage medium stores computer-executable instructions. When the computer-executable instructions are executed by at least one processor, the at least one processor implements the packet transmission method provided in any one of the first aspect or the implementations of the first aspect or the packet transmission method provided in any one of the second aspect or the implementations of the second aspect.

According to an eighth aspect, an embodiment provides a packet transmission system. The packet transmission system includes the first network device provided in any one of the third aspect or the implementations of the third aspect and the second network device provided in any one of the fourth aspect or the implementations of the fourth aspect. Alternatively, the packet transmission system includes the first network device provided in any one of the fifth aspect or the implementations of the fifth aspect and the second network device provided in any one of the sixth aspect or the implementations of the sixth aspect.

According to a ninth aspect, an embodiment provides a program product. The program product includes a computer program (namely, an executable instruction), and the computer program is stored in a readable-storage medium. When the computer program is read and executed by at least one processor, the at least one processor may perform the packet transmission method provided in any one of the first aspect and the implementations of the first aspect, or the packet transmission method provided in any one of the second aspect and the implementations of the second aspect.

Embodiments provide a packet transmission method and a device. The packet transmission method includes: receiving, by a first network device, a first packet sent by a previous-hop device of the first network device, where the first packet includes an SR header; generating, by the first network device, cache index information of the SR header, and storing the cache index information and the SR header; generating, by the first network device, a second packet based on the first packet, where the second packet includes the cache index information but does not include the SR header; and sending, by the first network device, the second packet to a second network device. When caching the SR header included in the first packet, the first network device generates the cache index information, and uses the cache index information as an index value for caching the SR header. The first network device adds the cache index information to the second packet that is to be sent to the second network device, so that the second network device returns, through the response packet, the cache index information to the first network device without modification. In this way, the cache index information carried in the second packet sent by the first network device to the second network device is the same as the cache index information carried in the response packet received by the first network device from the second network device. The first network device can successfully restore an SR header based on the cache index information, ensuring normal forwarding of a packet.

DETAILED DESCRIPTION

Embodiments provide a packet transmission method and a device. The following clearly describes the technical solutions in the embodiments with reference to the accompanying drawings. It should be noted that network architectures and service scenarios described in the embodiments are intended to describe the technical solutions in the embodiments more clearly, and do not constitute a limitation on the technical solutions provided in the embodiments. A person of ordinary skill in the art may know that as the network architecture evolves and a new service scenario emerges, the technical solutions provided in the embodiments are also applicable to a similar technical problem.

The packet transmission method provided in the embodiments may be applied to a network in which SR is used as a transmission tunnel. The network includes a network device, and the network device may be a device that performs a packet forwarding function. A name and an implementation of the network device are not limited in the embodiments and may vary with a deployment location and a role of the network device in the network. For example, the network device may be a router, a switch, a forwarder, an SFF, or an SF. The network device may be a physical device, or may be a virtual device implemented based on a virtualization technology.

Figure 1:
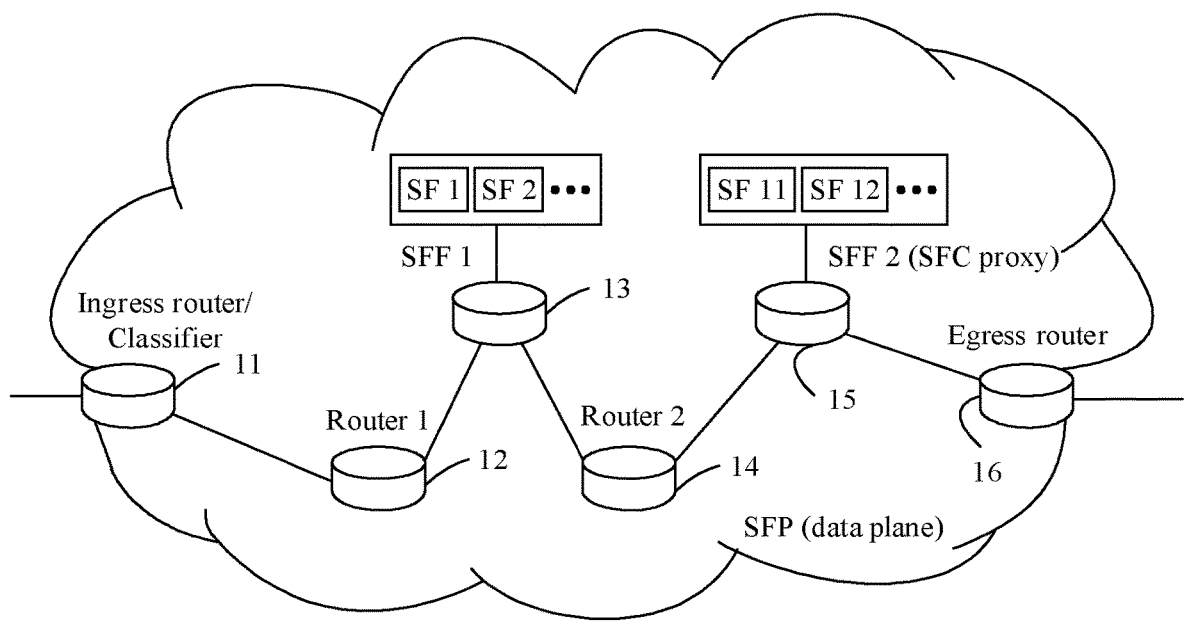
FIG. 1 is an architectural diagram of an SR SFC data plane system.

The following provides an example description, with reference to FIG. 1, a network and a scenario to which the embodiments are applicable.

For example, FIG. 1 is an architectural diagram of an SR SFC data plane system to which an embodiment is applicable. FIG. 1 shows a typical data plane network architecture, of an SFC, defined by the IETF. Types of network elements on the SR SFC data plane may include a classifier, an SFF, an SFC proxy, and an SF. Optionally, the SFF may also implement an SFC proxy function. In this case, the SFF may also be referred to as an "SFF (SFC proxy)." In FIG. 1, according to a forwarding direction and a forwarding path of a packet on a service function path (SFP), the data plane may include a network device 11 to a network device 16. The network device 11 may be referred to as an ingress router/classifier. The network device 12 may be referred to as a router 1. The network device 13 may be referred to as an SFF 1. The SFF 1 may communicate with at least one SF (which may be referred to as an SF 1, an SF 2, or the like). The network device 14 may be referred to as a router 2. The network device 15 may be referred to as an SFF 2 (SFC proxy). The SFF 2 (SFC proxy) may implement an SFC proxy function, and the SFF 2 (SFC proxy) may communicate with at least one SF (which may be referred to as an SF 11, an SF 12, or the like). The network device 16 may be referred to as an egress router. It should be noted that a name of each network device in the SFP is not limited in this embodiment. For example, a structure of the router 1 and a structure of the router 2 may be similar to that of the SFF 1 or the SFF 2, but names of network devices may be different.

In FIG. 1, according to the forwarding direction and the forwarding path of a packet in the SFP, for a network device in the SFP, a next network device adjacent to the network device on the forwarding path may be referred to as a next-hop device, a next-hop node, a downstream device, or a downstream node of the network device; and a previous network device adjacent to the network device on the forwarding path may be referred to as a previous-hop device, a previous-hop node, an upstream device, or an upstream node of the network device. For example, for the SFF 2 (SFC proxy), the router 2 is a previous-hop device of the SFF 2 (SFC proxy), and the egress router is a next-hop device of the SFF 2 (SFC proxy). For the SFF 1, the router 1 is a previous-hop device of the SFF 1, and the router 2 is a next-hop device of the SFF 1.

The following describes concepts related to the embodiments.

(1) SR

SR defined by the IETF-SPRING WG is a tunneling technology based on a source routing forwarding mode, and includes two data planes: a multi-protocol label switching (MPLS) data plane and an Internet Protocol version 6 (IPv6)

data plane, which are referred to as SR-MPLS and Segment Routing over IPv6 (SRv6). For details, refer to descriptions in the IETF-SPRING WG.

(2) SR Proxy

During implementation of the SR SFC, if the SF does not support SR (SR-MPLS or SRv6), the SFF needs to implement an SR proxy function. The SR proxy may include four types: a static proxy, a dynamic proxy, a shared-memory proxy, and a masquerading proxy. The dynamic proxy is the most commonly used SR proxy type. For details, refer to descriptions in the draft-xuclad-spring-sr-service-programming-00.

Figure 2:
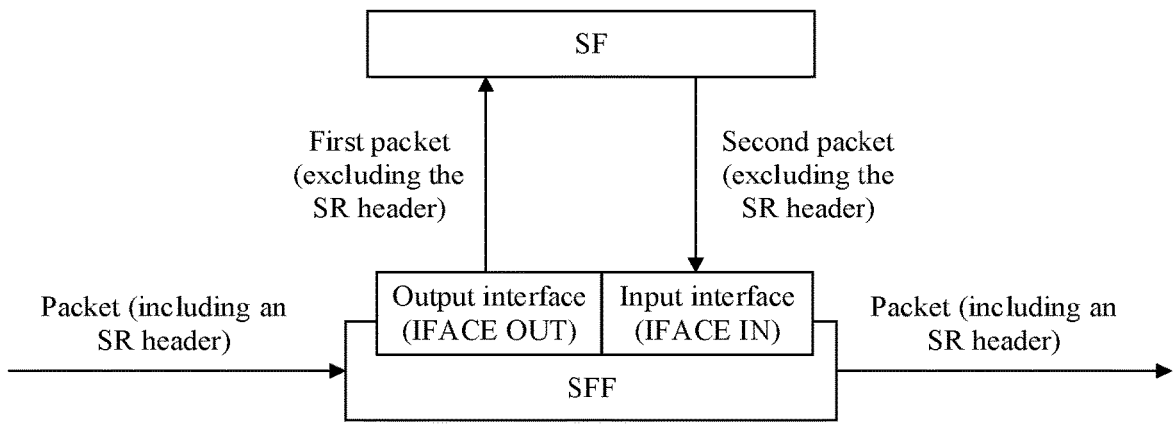
FIG. 2 is a general architectural diagram of an SR proxy.

For example, FIG. 2 is a general architectural diagram of an SR proxy. As shown in FIG. 2, two network devices may be an SFF and an SF. The SFF implements an SR proxy function. The SFF receives a packet from an upstream device and needs to forward the packet to the SF. If the SF does not support SR (i.e., is "SR-unaware"), the SFF removes an SR header from the packet received from the upstream device, and caches the SR header. The SFF sends a first packet to the SF through an output interface (OUT IFACE). The first packet does not include the SR header. After the SF processes the first packet, the SFF receives, through an input interface (also referred to as an IFACE IN interface), a second packet returned by the SF. The second packet does not include the SR header. The SFF restores encapsulation of an SR header for the second packet, and forwards an encapsulated packet to a downstream node.

It should be noted that names, quantities, and communications protocols to be complied of the output interface and the input interface are not limited in this embodiment. For example, according to an implementation specification of the SF, the output interface and the input interface may be a same interface or different interfaces. For example, the output interface and the input interface may comply with different communication protocols based on types of transmission tunnels between the SF and the SFF.

In a conventional technology, in a case in which the SF does not support the SR, when caching the SR header, the SFF may use a 5-tuple in the packet received from the upstream device as an index of an SR header cache entry. When receiving the packet returned by the SF, the SFF may obtain the locally stored SR header cache entry through a query based on the 5-tuple in the returned packet, to restore encapsulation of an SR header. However, the SF may modify the 5-tuple in the packet when processing the packet. Consequently, the 5-tuple in the packet received by the SFF from the upstream device is different from a 5-tuple in the packet returned by the SF. In this case, the 5-tuple used by the SFF to cache the SR header is different from the 5-tuple used by the SFF to restore an SR header. The SFF cannot obtain the cached SR header through a query based on the 5-tuple modified by the SF. Consequently, an SR header fails to be restored, and the packet fail to be forwarded.

For the foregoing technical problem, the packet transmission method provided in the embodiments may be applied to a scenario in which a first network device and the second network device perform packet forwarding. The second network device does not support SR. Optionally, the second network device modifies a 5-tuple in a packet. According to the packet transmission method provided in the embodiments, after the first network device receives a packet sent by an upstream device, the first network device removes an SR header from the packet, and caches the SR header. When caching the SR header, the first network device generates cache index information, and uses the cache index information as an index value of the SR header. The cache index information is carried in a packet sent by the first network device to the second network device, so that the second network device may return the cache index information to the first network device without modification. In this way, it is ensured that the cache index information used by the first network device to cache the SR header is the same as the cache index information received by the first network device from the second network device. Then, the first network device may obtain the locally cached SR header through a query based on the cache index information that does not change, to restore an SR header. This ensures normal forwarding of a packet.

The following uses specific embodiments to describe in detail the technical solutions and how the foregoing technical problem is resolved by using the technical solutions. The following several specific embodiments may be combined with one another. A same or similar concept or process may not be described in detail in some embodiments.

It should be noted that, in the embodiments, an example in which the first network device is an SFF and the second network device is an SF in a case of an SRv6 SFC is used to describe the packet transmission method provided in the embodiments. The SFF may implement an SR dynamic proxy function. The packet transmission method provided in the embodiments is also applicable to an SR-MPLS SFC. To simplify description, no further description is provided in the following.

It should be noted that a type of a transmission tunnel between the SFF and the SF is not limited in the embodiments. Optionally, any one of the following may be used as the transmission tunnel between the SFF and the SF: a Virtual eXtensible Local Area Network (VXLAN), generic protocol extension for VXLAN (VXLAN-GPE), Generic Network Virtualization Encapsulation (Geneve), Generic Routing Encapsulation (GRE), and IPv6. However, the transmission tunnel is not limited to the foregoing types.

It should be noted that, in the embodiments, "enabling" means enabling a function or making a function take effect. Enabling the SFF to add the cache index information to a second packet means that the SFF enables a function of "adding the cache index information to the second packet", or the function of "adding the cache index information to the second packet" takes effect in the SFF. That the SF is enabled to add the cache index information to a response packet for the second packet means that the SF enables a function of "adding the cache index information to the response packet for the second packet", or the function of "adding the cache index information to the response packet for the second packet" takes effect in the SF.

It should be noted that a specific value of the cache index information is not limited in the embodiments. The value of the cache index information may be a valid value or an invalid value. Whether the cache index information is a valid value or an invalid value is not limited in the embodiments. It should be noted that, in the embodiments, if it is not explicitly stated that the value of the cache index information is an invalid value, or it is explicitly stated that the value of the cache index information is a valid value, the value of the cache index information is a valid value. In some scenarios in which the value of the cache index information is an invalid value, it is explicitly stated in the embodiments that the value of the cache index information is an invalid value.

It should be noted that a specific value of identification information is not limited in the embodiments. The value of the identification information may be a valid value or an invalid value. Whether the identification information is a valid value or an invalid value is not limited in the embodiments. It should be noted that, in the embodiments, if it is not explicitly stated that the value of the identification information is an invalid value, or it is explicitly stated that the value of the identification information is a valid value, the value of the identification information is a valid value. In some scenarios in which the value of the identification information is an invalid value, it is explicitly stated in the embodiments that the value of the identification information is an invalid value.

Figure 3:
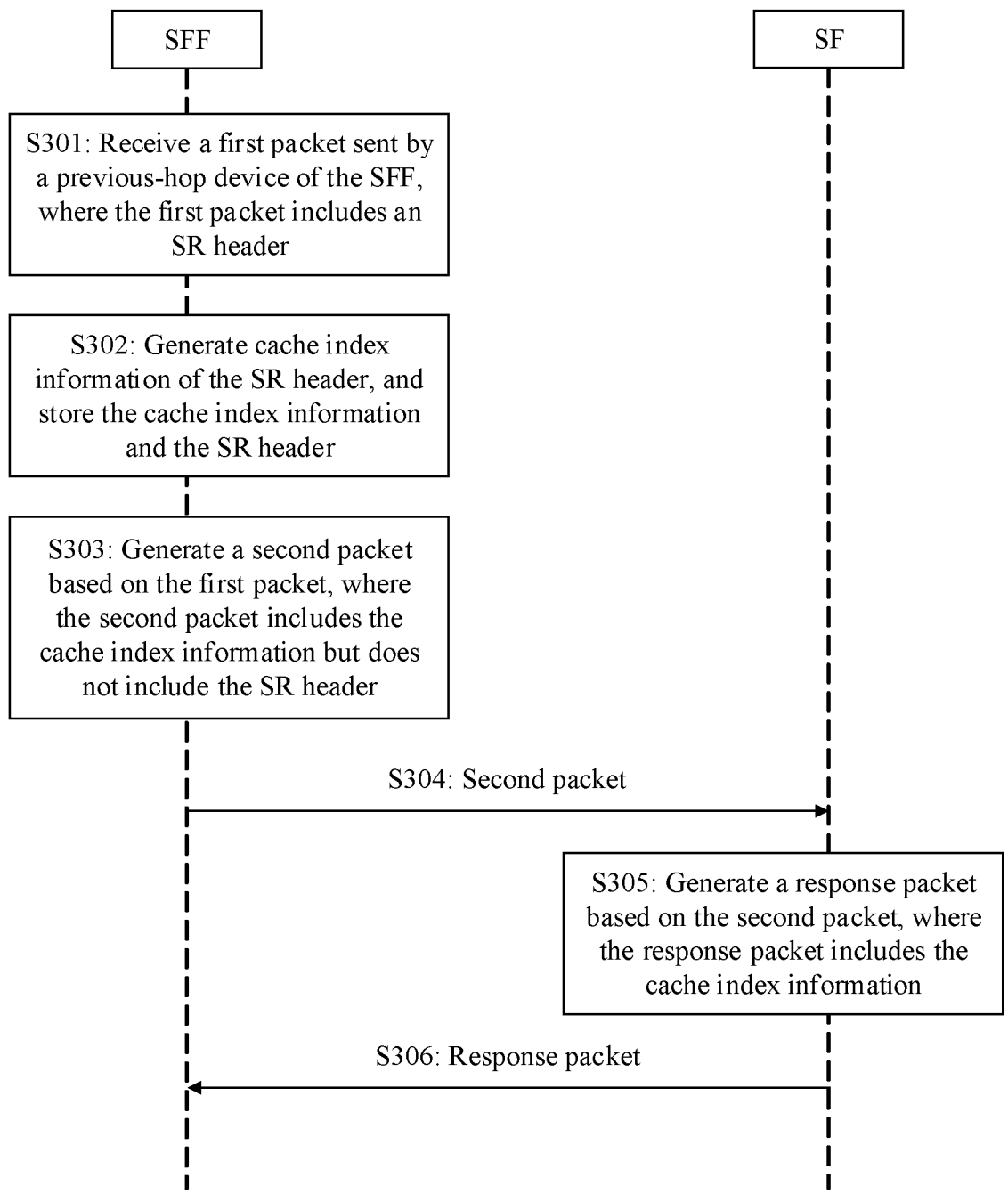
FIG. 3 is a message exchange diagram of a packet transmission method according to Embodiment 1.

FIG. 3 is a message exchange diagram of a packet transmission method according to Embodiment 1. The packet transmission method provided in this embodiment is jointly performed by an SFF and an SF. The SF does not support SR. As shown in FIG. 3, the packet transmission method provided in this embodiment may include the following steps.

S301: The SFF receives a first packet sent by a previous-hop device of the SFF, where the first packet includes an SR header.

The previous-hop device of the SFF is also referred to as a previous-hop node of the SFF, an upstream device of the SFF, or an upstream node of the SFF, and refers to a previous device adjacent to the SFF on a packet forwarding path. For details, refer to the related descriptions in FIG. 1. Principles are similar, and details are not described herein again. A type and a name of the previous-hop device of the SFF are not limited in this embodiment. For example, the previous-hop device of the SFF may be another SFF.

S302: The SFF generates cache index information of the SR header, and stores the cache index information and the SR header.

Specifically, because the SF does not support the SR, after receiving the first packet, the SFF needs to remove the SR header from the first packet, and cache the SR header. The SFF generates the cache index information of the SR header. The SR header is in a one-to-one correspondence with the cache index information. In other words, different SR headers may be distinguished by using cache index information. The SFF may use the cache index information that is in a one-to-one correspondence with the SR header as an index value for caching the SR header, and store the cache index information and the SR header.

It should be noted that an implementation of the cache index information is not limited in this embodiment. For example, the cache index information may be a binary sequence, an octal sequence, a hexadecimal sequence, or the like. A bit length and a specific value of the cache index information is not limited in this embodiment, and may vary according to different communications protocols between the SFF and the SF.

It should be noted that, the index value of the SR header includes the cache index information, and may further include other information. This is not limited in this embodiment. The index of the SR header may vary according to different communications protocols between the SFF and the SF and different service types to be implemented. For example, for an SR virtual private network (VPN) service, in addition to the cache index information, a VPN identifier (ID) may also be used as the index value of the SR header. In other words, a VPN ID and cache index information may be used to uniquely distinguish different SR headers.

Optionally, in S302, that the SFF generates cache index information of the SR header may include: obtaining, by the SFF, N-tuple information in the first packet, where the N-tuple information is used to indicate a data flow to which the first packet belongs, and N is an integer greater than 0.

The SFF generates the cache index information based on the N-tuple information.

The N-tuple information includes a combination of at least one protocol field used to uniquely identify a service flow. According to different communications protocols, quantities and combinations of protocol fields included in the N-tuple information may be different. This is not limited in this embodiment. For example, for an Ethernet service frame, the N-tuple information may include four fields, specifically source media access control (SMAC), destination MAC (DMAC), Ethernet type (Ether-Type), and VLAN tag, to identify the service flow. For details, refer to a related communications protocol of the Ethernet. For another example, for an Internet Protocol (IP) packet, the N-tuple information may include five fields, specifically source address (SA), destination address (DA), source port, destination port, and protocol.

The SFF generates, based on the N-tuple information in the first packet, the cache index information that is in a one-to-one correspondence with the SR header, where the cache index information is related to the N-tuple information. In this way, different SR headers and data flows may be distinguished by using the cache index information, and encapsulation of an SR header may be restored by using the cache index information. This further improves validity of the cached index information.

S303: The SFF generates a second packet based on the first packet. The second packet includes the cache index information but does not include the SR header.

Specifically, after removing the SR header from the first packet, the SFF processes, according to the communications protocol between the SFF and the SF, the first packet from which the SR header is removed, to generate the second packet. For example, a packet header of the second packet may be encapsulated. The second packet does not include the SR header, but includes the cache index information of the SR header. Subsequently, after receiving the second packet sent by the SFF, the SF determines that the second packet includes the cache index information, and the SF may return, through a response packet that is for the second packet and that is sent to the SFF, the cache index information without modification. In this way, the cache index information carried in the second packet sent by the SFF to the SF is the same as the cache index information carried in the response packet received by the SFF from the SF. The SFF may accurately obtain, from locally cached SR headers based on the cache index information carried in the response packet, the SR header included in the first packet, and then successfully restore the SR header. This resolves an existing problem that an SR header cannot be restored because the SF modifies 5-tuple information.

Optionally, the cache index information included in the second packet may be used to indicate to enable the SFF to add the cache index information to the second packet.

Specifically, to implement flexibility of packet processing, the SFF may be enabled or may not be enabled to add the cache index information to the second packet. In this implementation, the cache index information carried in the second packet sent by the SFF indicates that the SFF is enabled at a current moment to add the cache index information to the second packet. Subsequently, after receiving the second packet, the SF determines, based on the cache index information carried in the second packet, that the SFF has been enabled to add the cache index information to the second packet. Then the SF may return, through the response packet for the second packet, the cache index information without modification, and the SFF can successfully restore an SR header. A flexible implementation is provided to help deploy and manage a service on demand.

It should be noted that a location of the cache index information in the second packet is not limited in this embodiment. Optionally, the second packet includes a packet header, the packet header includes a content field, and the content field is used to carry the cache index information. It should be noted that a name of the content field and a location of the content field in the second packet are not limited in this embodiment.

Optionally, the second packet may further include identification information, and the identification information is used to indicate to enable the SFF to add the cache index information to the second packet.

Specifically, in this implementation, the second packet may include the cache index information and the identification information. The identification information is used to explicitly indicate that the SFF is enabled at a current moment to add the cache index information to the second packet. Subsequently, after receiving the second packet, the SF determines, based on the identification information carried in the second packet, that the SFF has been enabled to add the cache index information to the second packet. The SF may return, through the response packet for the second packet, the identification information and the cache index information that are carried in the second packet without modification, so that the SFF successfully restores an SR header. A flexible implementation is provided to help deploy and manage a service on demand.

It should be noted that a location of the identification information in the second packet is not limited in this embodiment. Optionally, the second packet includes a packet header, the packet header includes an identifier field, and the identifier field is used to carry the identification information. It should be noted that a name of the identifier field and a location of the identifier field in the second packet are not limited in this embodiment. Optionally, the content field and the identifier field in the second packet may be a same field. In this case, the identifier field may occupy some bits of the same field, and the content field may occupy remaining bits of the same field. For example, the second packet includes a field whose length is 10 bits. The identifier field occupies the first bit of the field, and the content field occupies the remaining nine bits of the field. Optionally, the content field and the identifier field in the second packet may be different fields.

S304: The SFF sends the second packet to the SF.

Correspondingly, the SF receives the second packet sent by the SFF. The second packet includes the cache index information.

S305: The SF generates a response packet based on the second packet. The response packet includes the cache index information.

Specifically, after receiving the second packet sent by the SFF, the SF determines that the second packet includes the cache index information. Then the SF adds the cache index information to the response packet for the second packet, to ensure that the cache index information carried in the second packet sent by the SFF to the SF is the same as the cache index information carried in the response packet received by the SFF from the SF. In this way, the SFF can successfully restore an SR header.

Optionally, the cache index information included in the response packet may be used to indicate to enable the SF to add the cache index information to the response packet.

Specifically, to implement flexibility of packet processing, the SF may be enabled or may not be enabled to add the cache index information to the response packet for the second packet. In this implementation, cache index information carried in the response packet that is for the second packet and that is sent by the SF indicates that the SF is enabled, at a current moment, to add the cache index information to the response packet for the second packet. Subsequently, after receiving the response packet for the second packet, the SFF determines, based on the cache index information carried in the response packet, that the SF has been enabled to add the cache index information to the response packet for the second packet. The SFF may successfully restore an SR header based on the cache index information carried in the response packet. A flexible implementation is provided to help deploy and manage a service on demand.

It should be noted that a location of the cache index information in the response packet for the second packet is not limited in this embodiment. Optionally, the response packet for the second packet includes a packet header, the packet header includes a content field, and the content field is used to carry the cache index information. It should be noted that a name of the content field and a location of the content field in the response packet for the second packet are not limited in this embodiment.

Optionally, the response packet may further include identification information, and the identification information is used to indicate to enable the SF to add the cache index information to the response packet.

Specifically, in this implementation, the response packet for the second packet may include the cache index information and the identification information. The identification information is used to explicitly indicate that the SF is enabled, at a current moment, to add the cache index information to the response packet for the second packet. Subsequently, after receiving the response packet for the second packet, the SFF determines, based on the identification information carried in the response packet, that the SF has been enabled to add the cache index information to the response packet for the second packet. The SFF may successfully restore an SR header based on the cache index information carried in the response packet. A flexible implementation is provided to help deploy and manage a service on demand.

It should be noted that a location of the identification information in the response packet for the second packet is not limited in this embodiment. Optionally, the response packet for the second packet includes a packet header, the packet header includes an identifier field, and the identifier field is used to carry the identification information. The content field and the identifier field that are included in the response packet for the second packet are respectively similar to the content field and the identifier field that are included in the second packet. For details, refer to the foregoing descriptions of the content field and the identifier field that are included in the second packet. Details are not described herein again.

S306: The SF sends the response packet to the SFF.

Correspondingly, the SFF receives the response packet sent by the SF.

It can be learned that according to the packet transmission method provided in this embodiment, after receiving the first packet sent by the previous-hop device of the SFF, the SFF generates the cache index information when caching the SR header included in the first packet, and uses the cache index information as the index value for caching the SR header. The SFF adds the cache index information to the second packet that is to be sent to the SF. In this way, the SF does not modify a value of the cache index information, and returns, through the response packet, the cache index information to the SFF without modification. In this way, the cache index information carried in the second packet sent by the SFF to the SF is the same as the cache index information carried in the response packet received by the SFF from the SF. The SFF may accurately obtain, from locally cached SR headers based on the cache index information carried in the response packet, the SR header included in the first packet, and then successfully restore the SR header. The first packet and a third packet include the SR header. The second packet and the response packet for the second packet do not include the SR header, but include the cache index information. The packet transmission method provided in this embodiment ensures normal forwarding of a packet.

Optionally, according to the packet transmission method provided in this embodiment, after S306 in which the SF sends the response packet to the SFF, the method may further include the following steps:

The SFF obtains, based on the cache index information in the response packet for the second packet, an SR header that is corresponding to the cache index information and that is stored in the SFF.

The SFF generates the third packet based on the response packet for the second packet. The third packet includes the SR header.

The SFF sends the third packet to a next-hop device of the SFF.

Specifically, the SFF receives the response packet that is for the second packet and that is returned by the SF. If the response packet carries the cache index information, the SFF queries, based on the cache index information carried in the response packet, locally stored SR headers for an SR header that matches the cache index information carried in the response packet. The cache index information carried in the second packet sent by the SFF to the SF is the same as the cache index information carried in the response packet received by the SFF from the SF. Therefore, the SFF can successfully obtain the matched SR header through the query based on the cache index information carried in the response packet. The matched SR header is the SR header in the first packet received by the SFF from the previous-hop device of the SFF. The SFF may successfully restore an SR header in the response packet based on the matched SR header, to generate a third packet, and send the third packet to the next-hop device of the SFF. This ensures normal forwarding of the packet.

The following describes, by using examples, the packet transmission method provided in this embodiment and content of the first packet, the second packet, the response packet for the second packet, and the third packet in a packet transmission process.

Figure 4:
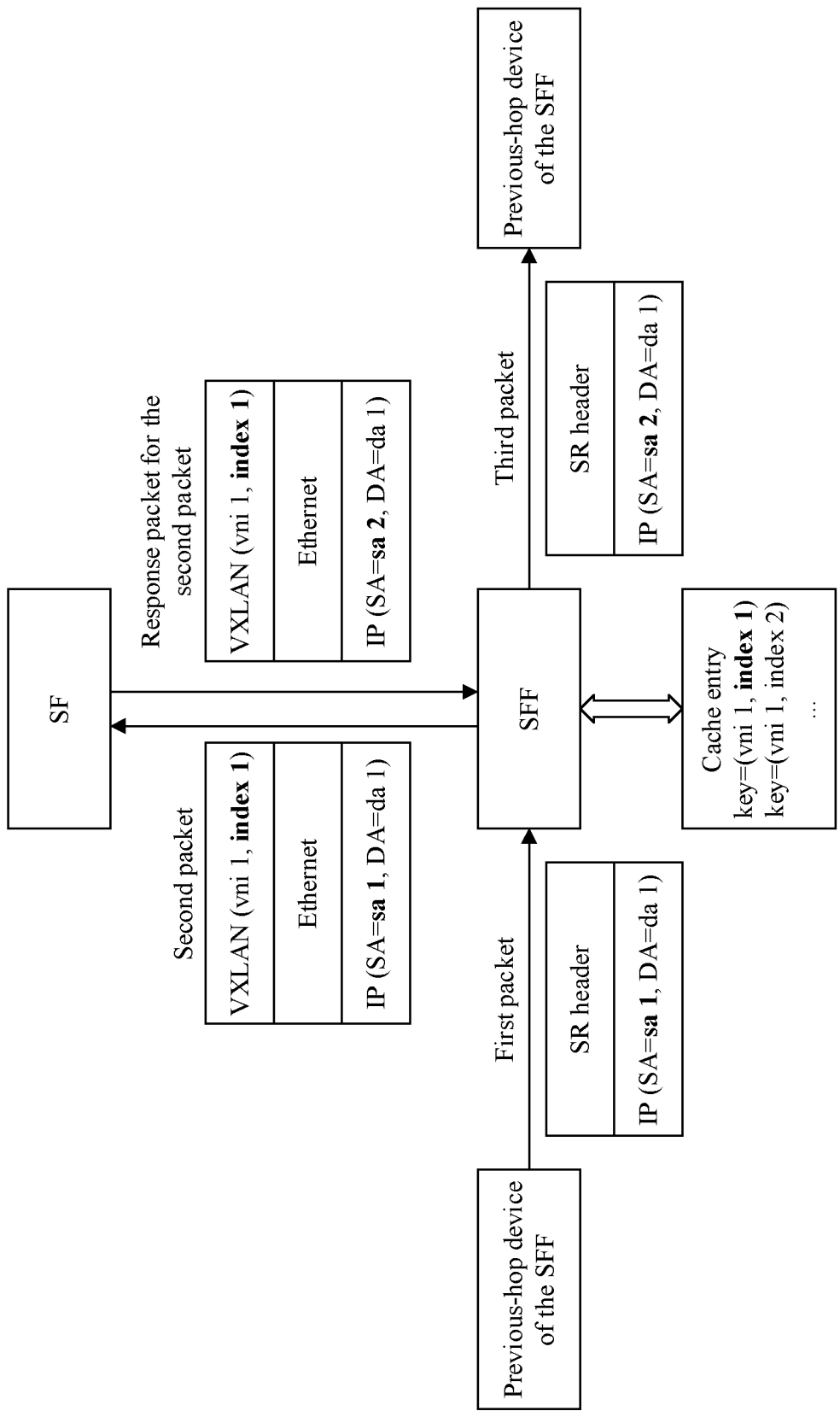
FIG. 4 is a schematic diagram of a packet structure in a packet transmission process according to Embodiment 1.

Optionally, in an example, FIG. 4 is a schematic diagram of a packet structure in the packet transmission process according to Embodiment 1. In FIG. 4, a VXLAN is used as a transmission tunnel between the SFF and the SF. The SR header may be an SRv6 header.

As shown in FIG. 4, the SFF receives the first packet from the previous-hop device of the SFF. The first packet includes the SR header and the N-tuple information. The N-tuple information is SA=sa 1, DA=da 1. Because the SF does not support the SR, the SFF needs to remove the SR header from the first packet. The SFF may generate the cache index information based on the N-tuple information in the first packet, where the cache index information is represented by index 1. Then, the SFF caches the SR header by using (vni 1, index 1) as the index value of the SR header. vni 1 is a VPN ID. In addition to information (for example, an SID list) used to indicate an SRv6 tunnel path, the SR header may further carry key information such as the VPN ID and SFC metadata. Therefore, to ensure continuity of an end-to-end service, when removing the SR header of the first packet, the SFF needs to re-encapsulate a new tunnel header to transmit the information to the SF. For specific implementation, refer to related descriptions in a VXLAN protocol. In this example, the VXLAN is used as the transmission tunnel between the SFF and SF. A VXLAN tunnel header of the second packet may include the cache index information index 1, and does not include the SR header. The second packet includes the N-tuple information SA=sa 1, DA=da 1. After receiving the second packet, the SF determines that the second packet includes the cache index information index 1, and processes a payload of the second packet to generate the response packet for the second packet. During the processing, the original N-tuple information SA=sa 1, DA=da 1 is changed to new N-tuple information SA=sa 2, DA=da 1. A VXLAN tunnel header of the response packet includes the cache index information index 1, and the response packet includes the N-tuple information SA=sa 2, DA=da 1. After receiving the response packet for the second packet, the SFF determines that the response packet includes the cache index information index 1. The SFF queries a locally stored cache entry based on the cache index information index 1 included in the response packet, and successfully obtains the SR header in the first packet. The SFF restores an SR header in the response packet to generate the third packet, and sends the third packet to the next-hop device of the SFF. The third packet includes the SR header, and includes the changed N-tuple information SA=sa 2, DA=da 1.

It can be learned that the SF may return same cache index information index 1 by adding the cache index information index 1 to the second packet. In a scenario in which the SF modifies the N-tuple information, the SFF can successfully restore an SR header of the packet by using the cache index information index 1 that is not modified. This ensures normal forwarding of the packet.

Figure 5:
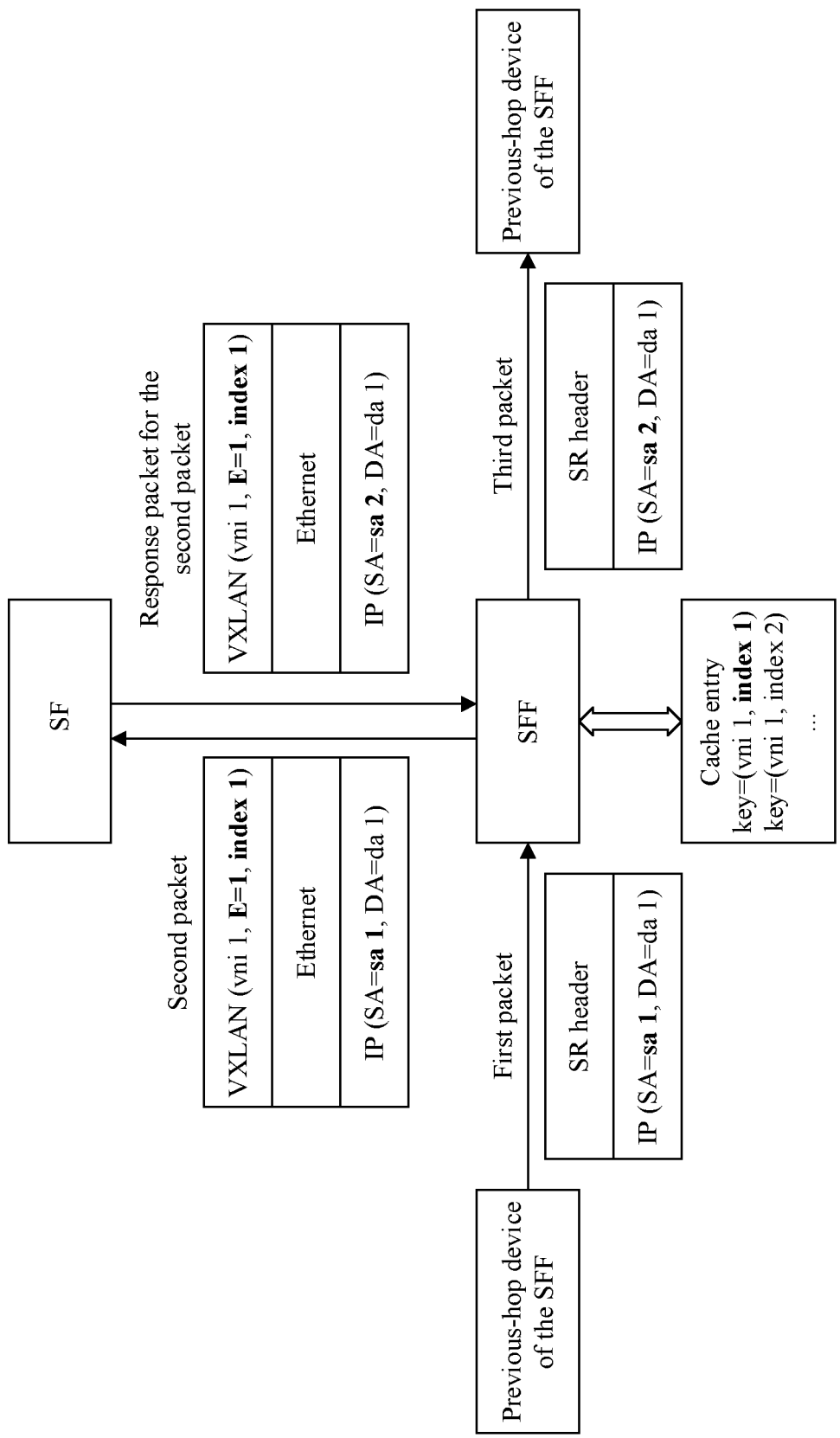
FIG. 5 is another schematic diagram of a packet structure in a packet transmission process according to Embodiment 1.

Optionally, in another example, FIG. 5 is another schematic diagram of a packet structure in the packet transmission process according to Embodiment 1. For related descriptions, refer to the example shown in FIG. 4. Details are not described herein again.

A difference between this example and the example shown in FIG. 4 lies in that, in this example, both the second packet and the response packet for the second packet include the cache index information index 1 and identification information E=1. However, in the example shown in FIG. 4, both the second packet and the response packet for the second packet include only the cache index information index 1.

This embodiment provides a packet transmission method, including: receiving, by the SFF, a first packet sent by the previous-hop device of the SFF, where the first packet includes an SR header; generating, by the SFF, cache index information of the SR header, and stores the cache index information and the SR header; generating, by the SFF, a second packet based on the first packet, where the second packet includes the cache index information but does not include the SR header; sending, by the SFF, the second packet to the SF; generating, by the SF, a response packet based on the second packet, where the response packet includes the cache index information; and sending, by the SF, the response packet to the SFF. According to the packet transmission method provided in this embodiment, when caching the SR header included in the first packet, the SFF generates the cache index information, and uses the cache index information as the index value for caching the SR header. The SFF adds the cache index information to the second packet that is to be sent to the SF. In this way, the SF does not modify a value of the cache index information, and returns, through the response packet, the cache index information to the SFF without modification. The SFF may accurately obtain, from locally cached SR headers based on the cache index information carried in the response packet, the SR header included in the first packet, and then successfully restore the SR header. This ensures normal forwarding of the packet.

Figure 6A:
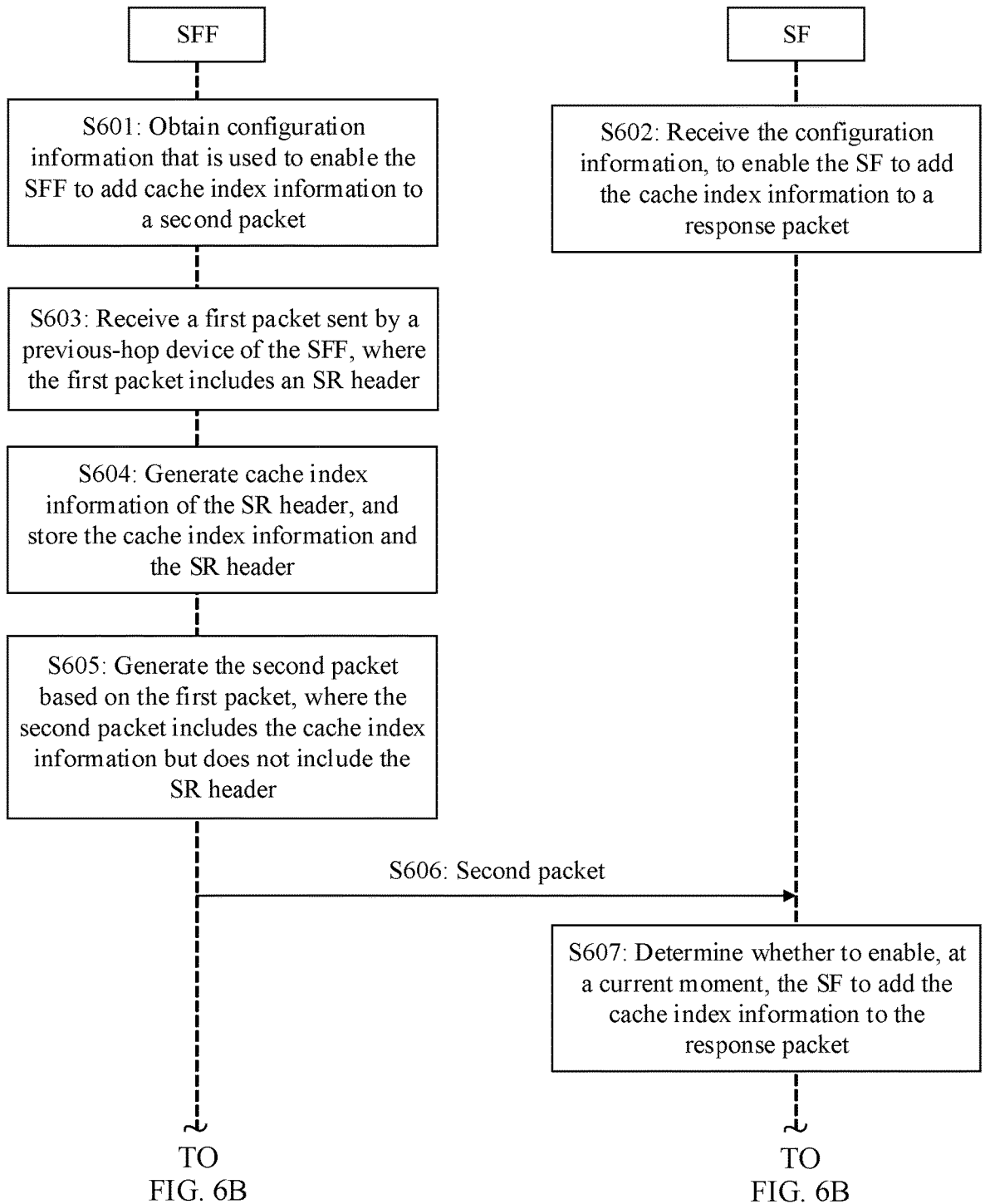
FIG. 6A and FIG. 6B are message exchange diagrams of a packet transmission method according to Embodiment 2.
Figure 6B:
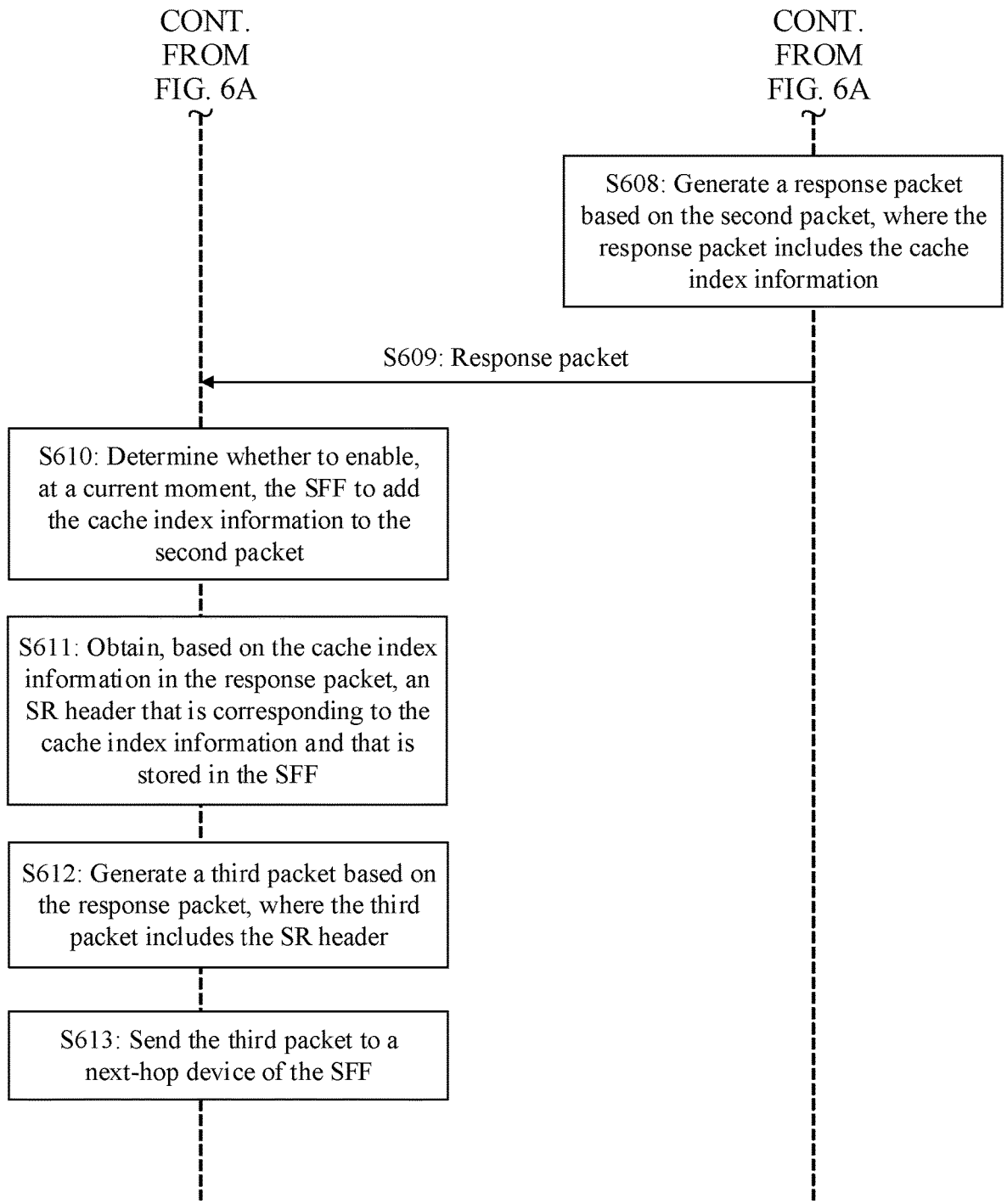

FIG. 6A and FIG. 6B are message exchange diagrams of a packet transmission method according to Embodiment 2. Based on Embodiment 1 shown in FIG. 3, this embodiment provides another implementation of a packet transmission method. The packet transmission method provided in this embodiment is jointly performed by an SFF and an SF. The SF does not support SR. As shown in FIG. 6A and FIG. 6B, the packet transmission method provided in this embodiment may include the following steps.

S601: The SFF obtains configuration information, where the configuration information is used to enable the SFF to add cache index information to a second packet.

Specifically, to implement flexibility of packet processing, the SFF may be enabled or may not be enabled to add the cache index information to the second packet. The SFF can implement a function of "adding the cache index information to the second packet" only after enabling is configured for the SFF.

Optionally, that the SFF obtains configuration information may include: receiving, by the SFF, a message from a control management device, where the message includes the configuration information.

In this implementation, the control management device may generate a message according to a user requirement, and send the message to the SFF. Correspondingly, the SFF receives the message, and obtains the configuration information from the message. The configuration information indicates to enable the SFF to add the cache index information to the second packet. It should be noted that a user refers to a network operator, a network manager, or a person that uses the network. The user requirement may be a requirement for using the network, managing the network, or the like. The user requirement may be manually configured and input on the control management device, or may be automatically obtained by the control management device after receiving a requirement message from another application server (for example, a third-party application server), or may be obtained in another manner. This is not limited in this embodiment. It should be noted that an implementation of the control management device is not limited in this embodiment.

Optionally, that the SFF obtains configuration information may include: obtaining, by the SFF, the configuration information through command line configuration.

For example, an administrator can log in to the SFF and perform a configuration operation by using command lines.

Optionally, that the SFF obtains configuration information may include: running, by the SFF, algorithm software to automatically generate the configuration information.

There are a plurality of methods for obtaining the configuration information, enriching technical implementations and improving usability.

S602: The SF receives the configuration information, where the configuration information is used to enable the SF to add the cache index information to a response packet.

Optionally, that the SF receives the configuration information may include: receiving, by the SF, the message from the control management device, where the message includes the configuration information; or obtaining, by the SF, the configuration information through command line configuration; or running, by the SF, algorithm software to automatically generate the configuration information.

For details, refer to the related descriptions in S601. Principles are similar, and details are not described herein again.

It should be noted that when to perform S602 is not limited in this embodiment, provided that S602 is performed before S607.

S603: The SFF receives a first packet sent by a previous-hop device of the SFF, where the first packet includes an SR header.

S604: The SFF generates cache index information of the SR header, and stores the cache index information and the SR header.

S605: The SFF generates the second packet based on the first packet. The second packet includes the cache index information but does not include the SR header.

S606: The SFF sends the second packet to the SF.

For S603 to S606, refer to the descriptions of S301 to S304. Principles are similar, and details are not described herein again.

S607: The SF determines whether to enable, at a current moment, the SF to add the cache index information to the response packet.

If the SF is enabled, at the current moment, to add the cache index information to the response packet, S608 is performed.

Specifically, to implement flexibility of packet processing, the SFF may be enabled or may not be enabled to add the cache index information to the second packet, and the SF may be enabled or may not be enabled to add the cache index information to a response packet for the second packet. In addition, only when enabling is configured for both the SFF and the SF, the SFF may add the cache index information to the second packet, and the SF returns, through the response packet for the second packet, the cache index information without modification. In this way, the SFF may successfully recover the SR header based on the cache index information. After receiving the second packet, the SF determines, based on the cache index information or identification information included in the second packet, that the SFF is enabled to add the cache index information to the second packet, and the SF may determine whether to enable, at a current moment, the SF to add the cache index information to the response packet. If the SF is enabled, at the current moment, to add the cache index information to the response packet, the SF may return, through the response packet for the second packet, the cache index information without modification. This improves effectiveness and flexibility of packet processing.

Optionally, if the SF is not enabled, at the current moment, to add the cache index information to the response packet, it indicates that the SF does not enable, at the current moment, a function of "adding the cache index information to the response message for the second packet"; or that the function of "adding the cache index information to the response packet for the second packet" does not take effect in the SF. In this case, the second packet may be processed according to an existing packet processing procedure. For example, the SF discards the second packet.

S608: The SF generates a response packet based on the second packet. The response packet includes the cache index information.

S609: The SF sends the response packet to the SFF.

For S608 and S609, refer to the descriptions of S305 and S306. Principles are similar, and details are not described herein again.

S610: The SFF determines whether to enable, at a current moment, the SFF to add the cache index information to the second packet.

If the SFF is enabled, at the current moment, to add the cache index information to the second packet, S611 is performed.

Specifically, to implement flexibility of packet processing, the SFF may be enabled or may be not enabled to add the cache index information to the second packet, and the SF may be enabled or may be not enabled to add the cache index information to the response packet for the second packet. In addition, only when enabling is configured for both the SFF and the SF, the SFF may add the cache index information to the second packet, and the SF returns, through the response packet for the second packet, the cache index information without modification. In this way, the SFF can successfully restore an SR header based on the cache index information. After receiving the response packet sent by the SF, the SFF determines, based on the cache index information or the identification information included in the response packet, that the SF is enabled to add the cache index information to the response message for the second packet. The SFF may first determine whether the SFF is enabled, at a current moment, to add the cache index information to the second packet. If the SFF is enabled, at the current moment, to add the cache index information to the second packet, the SFF can restore an SR header based on the cache index information carried in the response message. This improves effectiveness and flexibility of packet processing.

Optionally, if the SFF is not enabled, at the current moment, to add the cache index information to the second packet, it indicates that the SFF does not enable, at the current moment, a function of "adding, by the SFF, the cache index information to the second packet", or the function of "adding, by the SFF, the cache index information to the second packet" does not take effect in the SFF. In this case, the response packet may be processed according to the existing packet processing procedure. For example, the SFF discards the response packet.

S611: The SFF obtains, based on the cache index information in the response packet for the second packet, an SR header that is corresponding to the cache index information and that is stored in the SFF.

S612: The SFF generates a third packet based on the response packet for the second packet. The third packet includes the SR header.

S613: The SFF sends the third packet to a next-hop device of the SFF.

For S611 to S613, refer to the descriptions in Embodiment 1 shown in FIG. 3. Principles are similar, and details are not described herein again.

This embodiment provides a packet transmission method. By obtaining the configuration information, the SFF can be enabled to add the cache index information to the second packet. By obtaining the configuration information, the SF can be enabled to add the cache index information to the response packet. When enabling is configured for both the SFF and the SF, the SFF may add the cache index information to the second packet that is to be sent to the SF. In this way, the SF does not modify a value of the cache index information, and returns, through the response packet, the cache index information to the SFF without modification. The SFF may accurately obtain, from locally cached SR headers based on the cache index information carried in the response packet, the SR header included in the first packet, and then successfully restore the SR header. This ensures normal forwarding of the packet.

Optionally, Embodiment 3 further provides a packet transmission method. The packet transmission method provided in this embodiment is jointly performed by an SFF and an SF. The SF does not support SR. The packet transmission method provided in this embodiment may include S301 to S304 in Embodiment 1 shown in FIG. 3, or S306 in Embodiment 1 shown in FIG. 3, or S601 to S607 in Embodiment 2 shown in FIG. 6A and FIG. 6B, or S609 and S610 in Embodiment 2 shown in FIG. 6A and FIG. 6B. A difference between this embodiment and Embodiment 1 or Embodiment 2 lies in that, in this embodiment, cache index information included in a second packet or a response packet for the second packet is an invalid value, or when the second packet or the response packet for the second packet further includes identification information, the identification information is an invalid value. However, in Embodiment 1 or Embodiment 2, the cache index information included in the second packet or the response packet for the second packet is a valid value, or when the second packet or the response packet for the second packet further includes identification information, the identification information is a valid value.

Optionally, in this embodiment, in an optional implementation, the second packet includes the cache index information, and the cache index information is an invalid value. In this case, the cache index information included in the second packet is an invalid value, which is used to indicate that the SFF is not enabled to add the cache index information to the second packet, or is used to indicate a packet transmission error. A cause value of the packet transmission error is not limited in this embodiment. For example, the cause value may be a packet header encapsulation error or a change in a packet header transmission process. Correspondingly, after receiving the second packet sent by the SFF, the SF determines that the second packet carries the cache index information. However, when the cache index information is an invalid value, it indicates that the SFF is not enabled to add the cache index information to the second packet, or that a packet transmission error occurs. In this case, the SF may process the second packet according to an existing packet processing procedure. For example, the SF discards the second packet.

Optionally, in this embodiment, in another optional implementation, the response packet for the second packet includes the cache index information, and the cache index information is an invalid value. In this case, the cache index information included in the response packet for the second packet is an invalid value, which is used to indicate that the SF is not enabled to add the cache index information to the response packet for the second packet, or used to indicate a packet transmission error. A cause value of the packet transmission error is not limited in this embodiment. For example, the cause value may be a packet header encapsulation error or a change in a packet header transmission process. Correspondingly, after receiving the response packet that is for the second packet and that is sent by the SF, the SFF determines that the response packet for the second packet carries the cache index information. However, when the cache index information is an invalid value, it indicates that the SF is not enabled to add the cache index information to the response packet for the second packet, or that a packet transmission error occurs. In this case, the SFF may process the response packet according to the existing packet processing procedure. For example, the SFF discards the response packet.

Optionally, in this embodiment, in still another optional implementation, the second packet includes the cache index information and the identification information, and the identification information is an invalid value. Optionally, the cache index information may be a valid value, or may be an invalid value. In this case, the identification information included in the second packet is an invalid value, which is used to indicate, regardless of whether the cache index information included in the second packet is a valid value, that the SFF is not enabled to add the cache index information to the second packet. Correspondingly, after receiving the second packet sent by the SFF, the SF determines that the second packet carries the identification information. However, when the identification information is an invalid value, it indicates that the SFF is not enabled to add the cache index information to the second packet. In this case, the SF may process the second packet according to the existing packet processing procedure. For example, the SF discards the second packet.

Optionally, in this embodiment, in yet another optional implementation, the response packet for the second packet includes the cache index information and the identification information, and the identification information is an invalid value. Optionally, the cache index information may be a valid value, or may be an invalid value. In this case, the identification information included in the response packet for the second packet is an invalid value, which is used to indicate, regardless of whether the cache index information included in the response packet for the second packet is a valid value, that the SF is not enabled to add the cache index information to the response packet for the second packet. Correspondingly, after receiving the response packet that is for the second packet and that is sent by the SF, the SFF determines that the response packet for the second packet carries the identification information. However, when the identification information is an invalid value, it indicates that the SF is not enabled to add the cache index information to the response packet for the second packet. In this case, the SFF may process the response packet according to the existing packet processing procedure. For example, the SFF discards the response packet.

It can be learned that in the packet transmission method provided in this embodiment, if the cache index information carried in the second packet or the response packet for the second packet is an invalid value, or the identification information carried in the second packet or the response packet for the second packet is an invalid value, it indicates a scenario in which enabling is not configured for the SFF or the SF. In this case, the SFF or the SF may process the packet according to the existing packet processing procedure.

The following uses examples to describe, based on different types of transmission tunnels between an SFF and an SF, a content field and an identifier field that are included in a packet header of a second packet, and a content field and an identifier field that are included in a packet header of a response packet for the second packet. It should be noted that, in the following examples, locations and lengths of the content field and the identifier field in the packet header are merely examples. During implementation, the content field and the identifier field may be located in any reserved location in the packet header and have any length. It should be noted that cache index information carried in the content field may be a valid value or may be an invalid value, and identification information carried in the identifier field may be a valid value or may be an invalid value. In different scenarios, the packet header including the content field and the identifier field may correspond to different protocols, and the content field and the identifier field may be located in different locations in the packet header.

Figure 7:
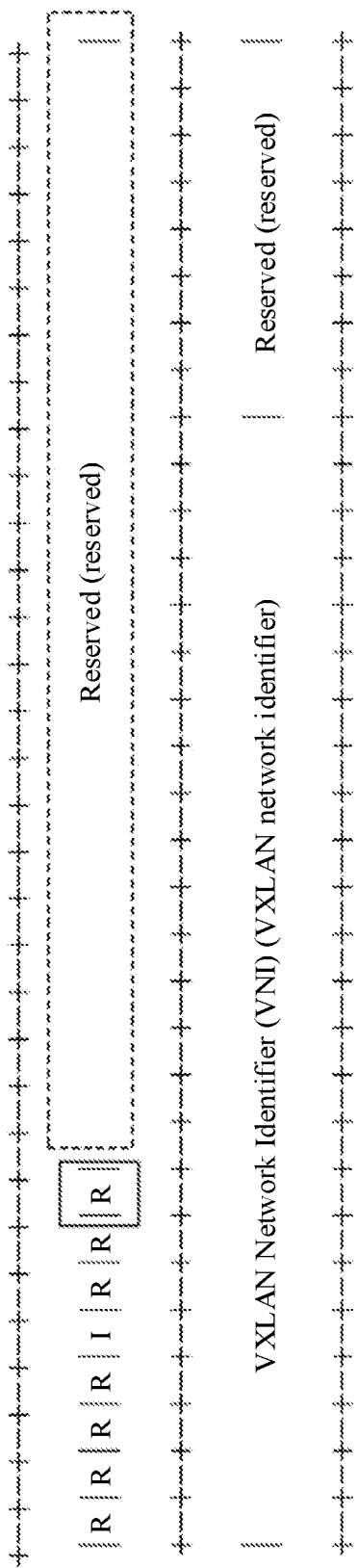
FIG. 7 is a schematic structural diagram of a VXLAN tunnel header according to an embodiment.

Optionally, in a first example, a transmission tunnel between the SFF and the SF is a VXLAN. For details about the VXLAN, refer to descriptions in M. Mahalingam, et al., "Virtual eXtensible Local Area Network (VXLAN): A Framework for Overlaying Virtualized Layer 2 Networks over Layer 3 Networks," RFC 7348, August 2014, which is incorporated by reference. The VXLAN is a MAC-in-UDP encapsulation format. A UDP destination port number in the VXLAN has to be set to 4789. For example, FIG. 7 is a schematic structural diagram of a VXLAN tunnel header according to an embodiment. As shown in FIG. 7, the VXLAN header currently includes several reserved flag bits (represented by R) and two reserved fields. In this example, a reserved flag bit R may be defined as an identifier field. For details, refer to the solid-line box in FIG. 7. One of the reserved fields may be defined as a content field. For details, refer to the dashed-line box in FIG. 7.

Figure 8:
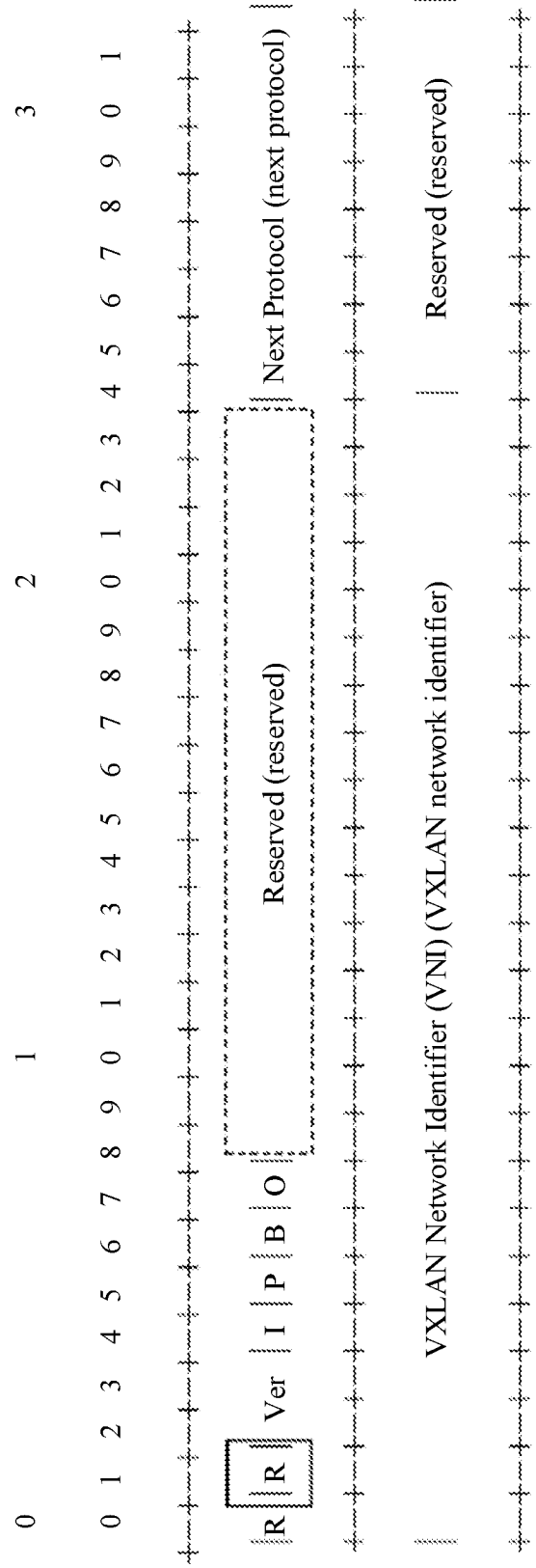
FIG. 8 is a schematic structural diagram of a VXLAN-GPE tunnel header according to an embodiment.

Optionally, in a second example, the transmission tunnel between the SFF and the SF is VXLAN-GPE. For details about the VXLAN-GPE, refer to descriptions in the draft [draft-ietf-nvo3-vxlan-gpe-06]. To distinguish the VXLAN-GPE from the VXLAN, a UDP destination port number in the VXLAN-GPE has to be set to 4790. For example, FIG. 8 is a schematic structural diagram of a VXLAN-GPE tunnel header according to an embodiment. As shown in FIG. 8, the VXLAN-GPE is an extension of the VXLAN. Compared with the VXLAN header, the VXLAN-GPE header may be extended with a next protocol field, to carry various protocol encapsulations, such as Ethernet, IPv4, IPv6, MPLS, and NSH. However, the VXLAN can carry only an Ethernet frame. The VXLAN-GPE header currently includes two reserved flag bits (represented by R) and two reserved fields. In this example, a reserved flag bit R may be defined as an identifier field. For details, refer to the solid-line box in FIG. 8. One of the reserved fields may be defined as a content field. For details, refer to the dashed-line box in FIG. 8.

Figure 9:
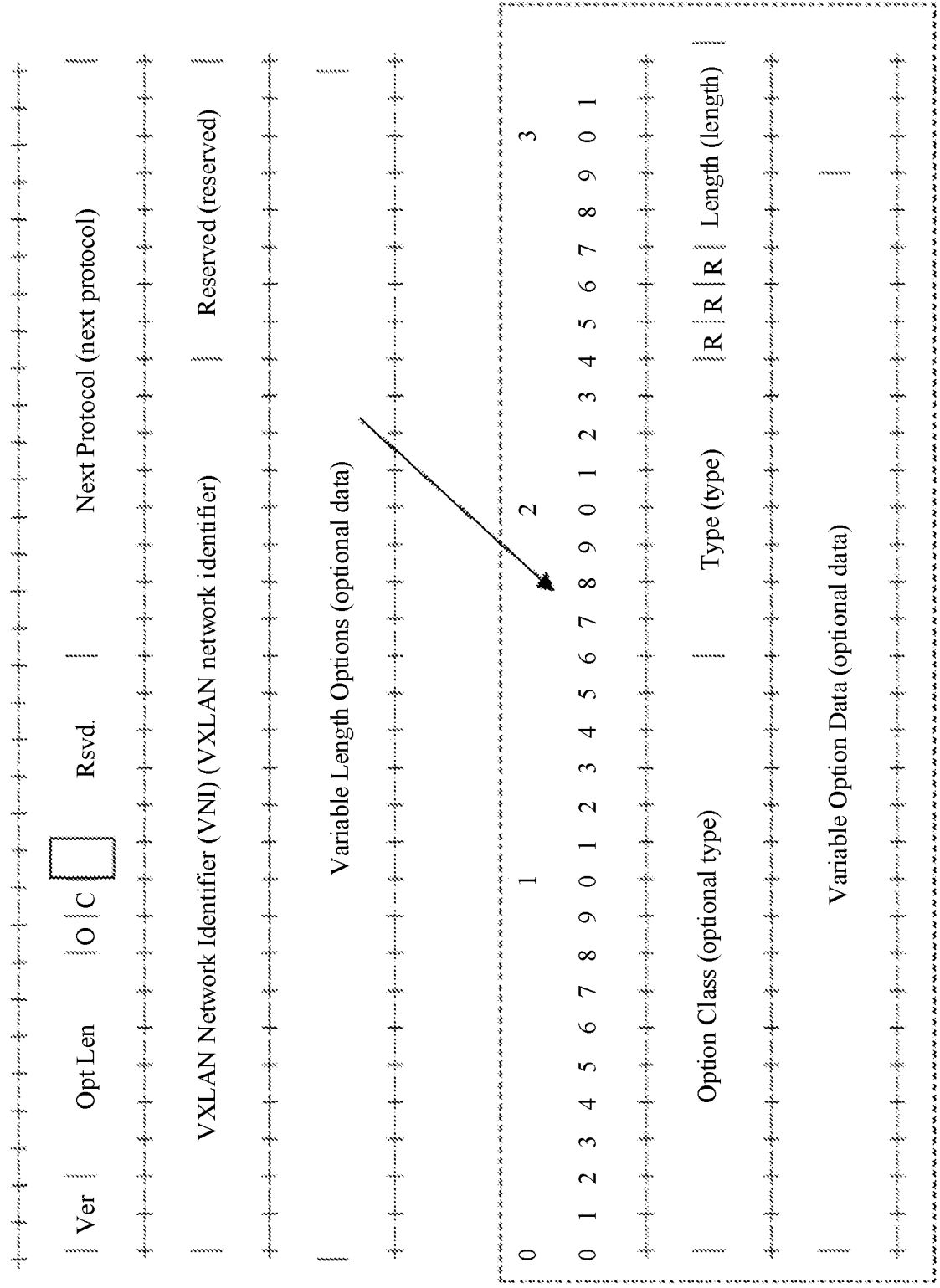
FIG. 9 is a schematic structural diagram of a Geneve tunnel header according to an embodiment.

Optionally, in a third example, the transmission tunnel between the SFF and the SF is Geneve. For details about the Geneve, refer to descriptions in the draft [draft-ietf-nvo3-geneve-08]. For differentiation, a UDP destination port number in the Geneve has to be set to 6081. For example, FIG. 9 is a schematic structural diagram of a Geneve tunnel header according to an embodiment. As shown in FIG. 9, compared with the VXLAN header, the Geneve header may be extended with a next protocol field, and extended with optional TLV information at an extension header. Because the Geneve supports carrying of an optional TLV, a new TLV type may be defined as a content field. For details, refer to the dashed-line box in FIG. 9. An identifier field may be defined in a fixed header. For details, refer to the solid-line box in FIG. 9.

Figure 10:
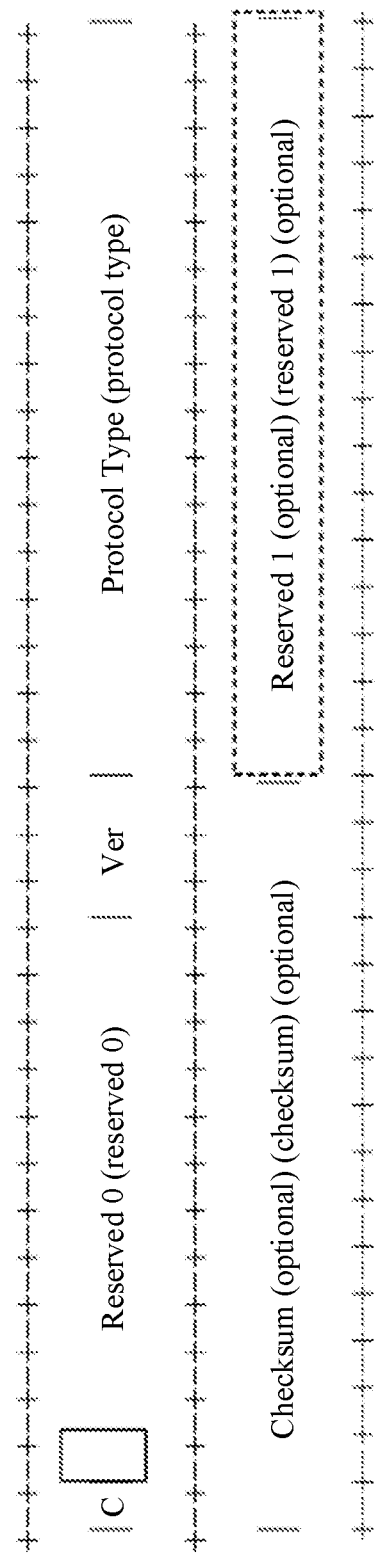
FIG. 10 is a schematic structural diagram of a GRE tunnel header according to an embodiment.

Optionally, in a fourth example, the transmission tunnel between the SFF and the SF is GRE. For details about the GRE, refer to descriptions in D. Farinacci, et al., "Generic Routing Encapsulation (GRE)," RFC 2784, March 2000, which is incorporated by reference. C. Pignataro, et al., "IPv6 Support for Generic Routing Encapsulation (GRE)," RFC 7676, October 2015, which is incorporated by reference, also defines specifications for IPv6. An encapsulation format of a GRE header in RFC2784 is the same as that in RFC7676. For example, FIG. 10 is a schematic structural diagram of a GRE tunnel header according to an embodiment. As shown in FIG. 10, a GRE header also includes reserved flag bits and reserved fields. In this example, one of the reserved flag bits may be defined as an identifier field. For details, refer to the solid-line box in FIG. 10. One of the reserved fields may be defined as a content field. For details, refer to the dashed-line box in FIG. 10.

Figure 11:
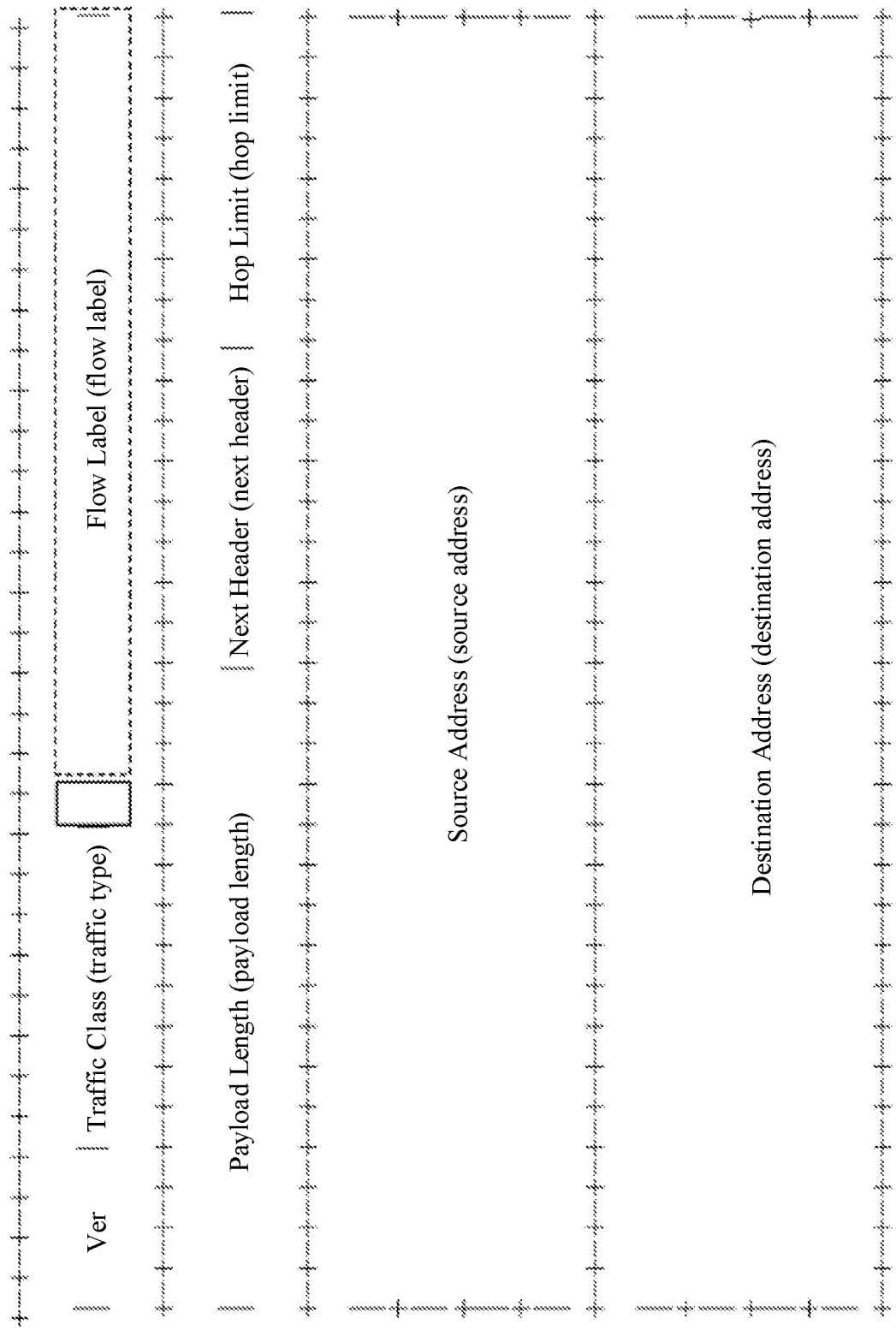
FIG. 11 is a schematic structural diagram of a IPv6 tunnel header according to an embodiment.

Optionally, in a fifth example, the transmission tunnel between the SFF and the SF is IPv6. For the IPv6, refer to descriptions in the [RFC2473 Generic Packet Tunneling in IPv6 Specification], where a general specification is defined for IPv6 tunnels such as IPv4-in-IPv6 and IPv6-in-IPv6. IPv4-in-IPv6 indicates that an IPv6 header is encapsulated based on an IPv4 packet. IPv6-in-IPv6 indicates that the IPv6 header is encapsulated based on an IPv6 packet. For example, FIG. 11 is a schematic structural diagram of an IPv6 tunnel header according to an embodiment. As shown in FIG. 11, in this example, bits in a flow label field in the IPv6 header may be defined as an identifier field and a content field. For details about the identifier field, refer to the solid-line box in FIG. 11. For details about the content field, refer to the dashed-line box in FIG. 11.

Figure 12:
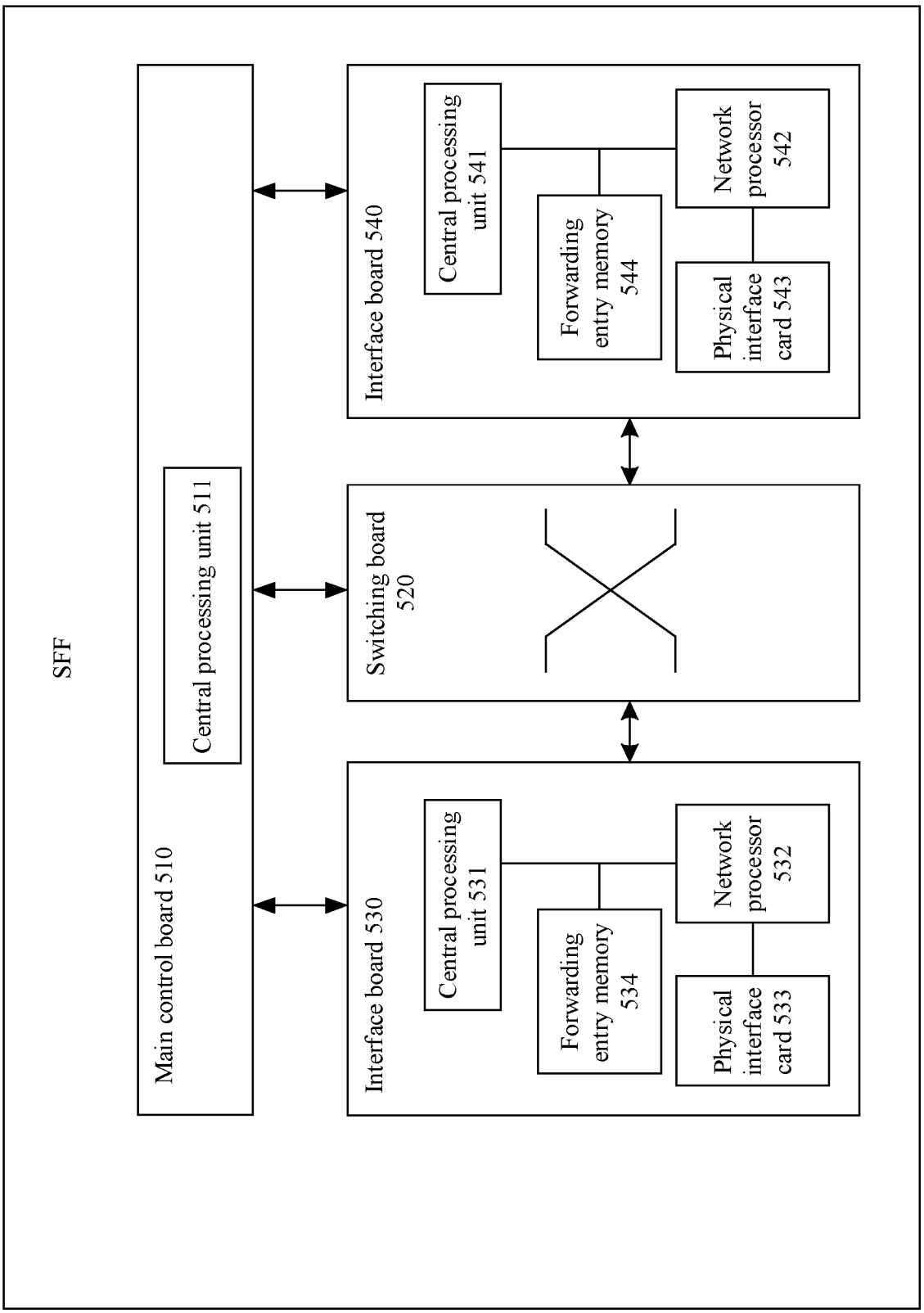
FIG. 12 is a schematic structural diagram of an SFF according to Embodiment 1.

FIG. 12 is a schematic structural diagram of an SFF according to Embodiment 1. The SFF shown in FIG. 12 may be applied to an SRv6 network, and includes a main control board 510, an interface board S30, a switching board 520, and an interface board 540. The main control board 510 is configured to implement functions such as system management, device maintenance, and protocol processing. The switching board 520 is configured to complete data exchange between the interface boards (the interface board is also referred to as a line card or a service board). The interface board S30 and the interface board 540 are configured to provide various service interfaces (for example, an Ethernet interface and a Packet over SONET/SDH (POS) interface), and implement packet forwarding. The main control board 510, the interface board S30, the interface board 540, and the switching board 520 are connected to a system backplane through a system bus to implement interworking. A central processing unit 531 on the interface board S30 is configured to control and manage the interface board and communicate with a central processing unit 511 on the main control board 510.

The SFF receives, from a physical interface card 533, a first packet sent by a previous-hop device of the SFF, where the first packet includes an SR header. The physical interface card 533 sends the first packet to a network processor 532. The network processor 532 queries a forwarding entry memory 534 based on the first packet, and a matching result indicates that the packet is a local packet. Therefore, the network processor 532 sends the first packet to the central processing unit 511 on a control plane. The central processing unit 511 on the main control board 510 may perform S302 and S303 in Embodiment 1 shown in FIG. 3. The physical interface card 533 and the network processor 532 may perform S304 and S306 in Embodiment 1 shown in FIG. 3. Reference may be made to the foregoing related descriptions, and details are not described herein again.

It should be understood that an operation on the interface board 540 is the similar to an operation on the interface board S30 in this embodiment. For brevity, details are not described again. It should be understood that there may be one or more main control boards, and in a case of a plurality of main control boards, there may be an active main control board and a standby main control board. There may be one or more interface boards, and there may also be one or more physical interface cards on the interface board. There may be no switching board, or there may be one or more switching boards. A specific architecture to be used depends on a specific networking deployment scenario. This is not limited herein.

Figure 13:
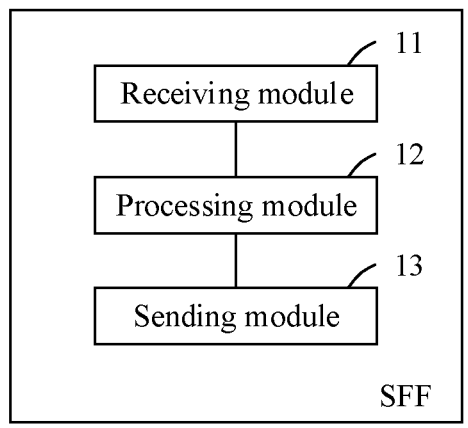
FIG. 13 is a schematic structural diagram of an SFF according to Embodiment 2.

FIG. 13 is a schematic structural diagram of an SFF according to Embodiment 2. The SFF provided in this embodiment may perform operations performed by the SFF in the embodiments shown in FIG. 3 to FIG. 11. As shown in FIG. 13, the SFF provided in this embodiment may include: a receiving module 11 configured to receive a first packet sent by a previous-hop device of the SFF, where the first packet includes an SR header; a processing module 12 configured to: generate cache index information of the SR header, and store the cache index information and the SR header; and generate a second packet based on the first packet, where the second packet includes the cache index information but does not include the SR header; and a sending module 13 configured to send the second packet to an SF.

Optionally, the cache index information is used to indicate to enable the SFF to add the cache index information to the second packet.

Optionally, the second packet further includes identification information, and the identification information is used to indicate to enable the SFF to add the cache index information to the second packet.

Optionally, the processing module 12 is further configured to: obtain N-tuple information in the first packet, where the N-tuple information is used to indicate a data flow to which the first packet belongs, and N is an integer greater than 0; and generate See above the cache index information based on the N-tuple information.

Optionally, the receiving module 11 is further configured to receive a response packet that is for the second packet and that is sent by the SF, where the response packet for the second packet includes the cache index information.

The processing module 12 is further configured to obtain, based on the cache index information, an SR header that is corresponding to the cache index information and that is stored in the SFF; and generate a third packet based on the response packet for the second packet, where the third packet includes the SR header.

The sending module 13 is further configured to send the third packet to a next-hop device of the SFF.

Optionally, the processing module 12 is further configured to: determine whether to enable, at a current moment, the SFF to add the cache index information to the second packet; and if the SFF is enabled, at the current moment, to add the cache index information to the second packet, perform the step of obtaining, based on the cache index information, an SR header that is corresponding to the cache index information and that is stored in the SFF.

Optionally, the receiving module 11 is further configured to: obtain configuration information, where the configuration information is used to enable the SFF to add the cache index information to the second packet.

Optionally, the second packet includes a packet header, the packet header includes a content field, and the content field is used to carry the cache index information.

Optionally, the second packet includes a packet header, the packet header includes an identifier field, and the identifier field is used to carry the identification information.

The SFF provided in this embodiment is configured to perform operations performed by the SFF in the embodiments shown in FIG. 3 to FIG. 11. Technical principles and technical effects are similar, and details are not described herein again.

Figure 14:
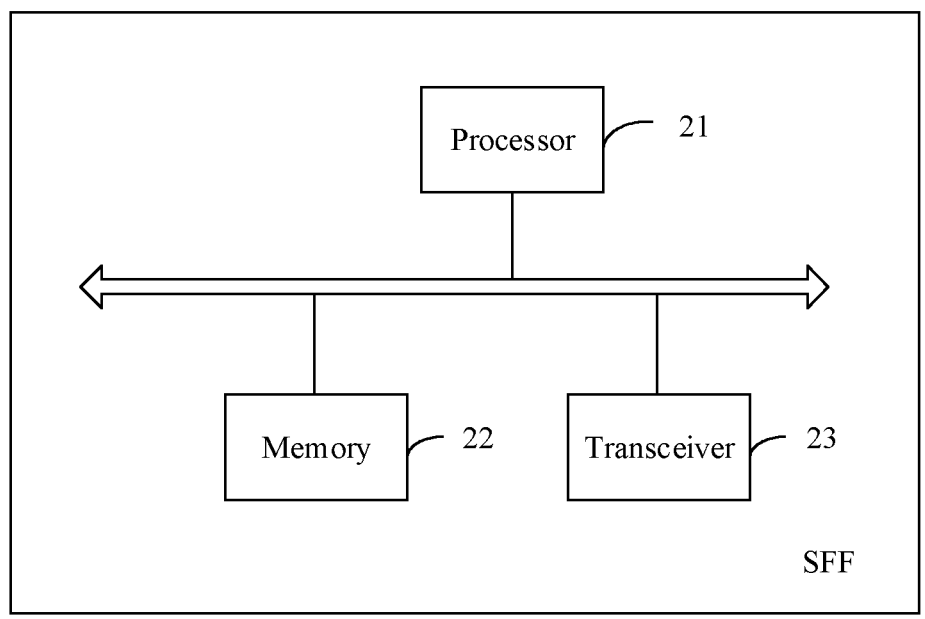
FIG. 14 is a schematic structural diagram of an SFF according to Embodiment 3.

FIG. 14 is a schematic structural diagram of an SFF according to Embodiment 3. As shown in FIG. 14, the SFF provided in this embodiment may include a processor 21, a memory 22, and a transceiver 23. The transceiver 23 is configured to receive or send data. The memory 22 is configured to store instructions. The processor 21 is configured to execute the instructions stored in the memory 22, to perform operations performed by the SFF in the embodiments shown in FIG. 3 to FIG. 11.

The SFF provided in this embodiment is configured to perform the operations performed by the SFF in the embodiments shown in FIG. 3 to FIG. 11. Technical principles and technical effects are similar, and details are not described herein again.

Figure 15:
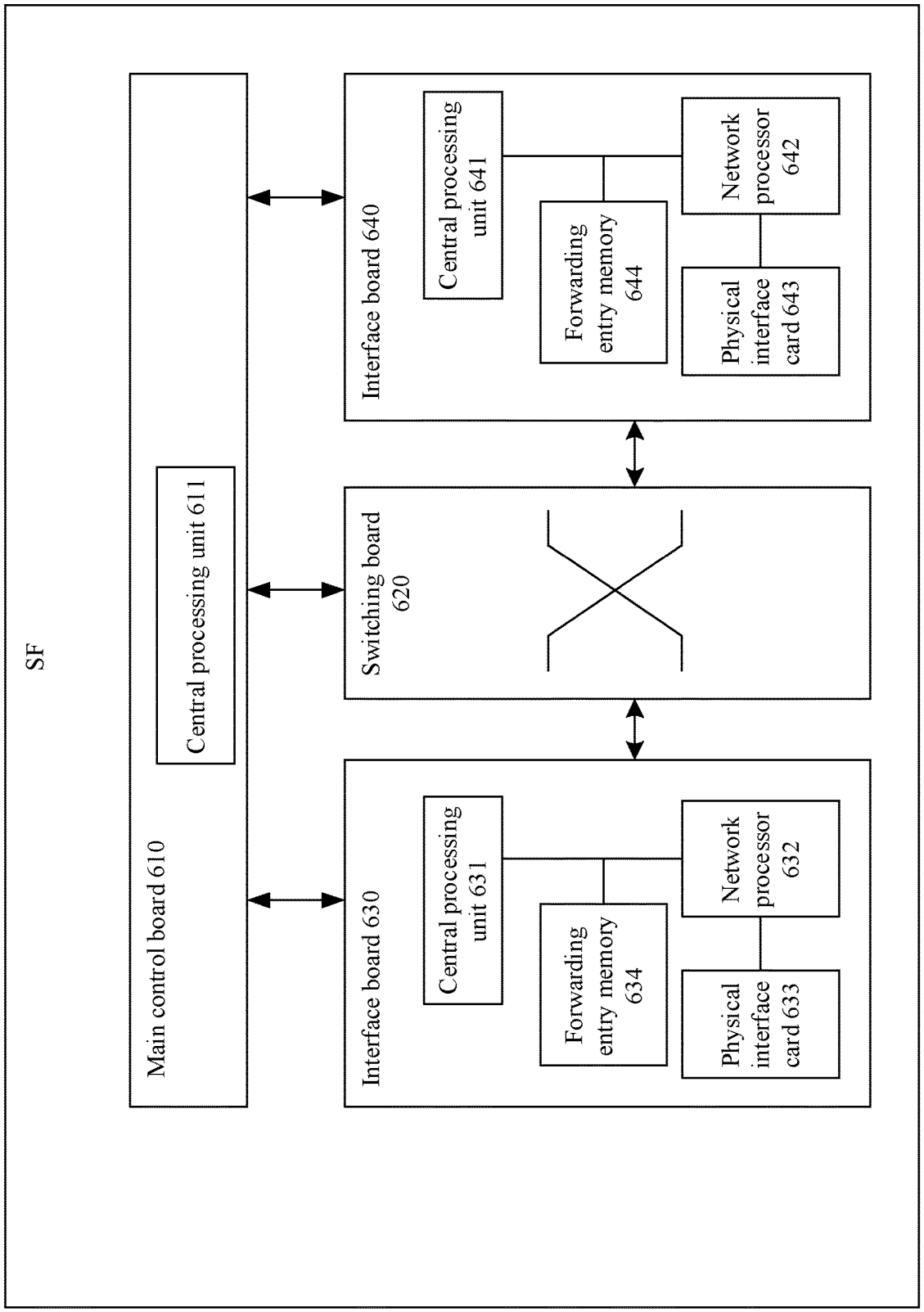
FIG. 15 is a schematic structural diagram of an SF according to Embodiment 1.

FIG. 15 is a schematic structural diagram of an SF according to Embodiment 1. The SF shown in FIG. 15 may be applied to an SRv6 network, and includes a main control board 610, an interface board 630, a switching board 620, and an interface board 640. The main control board 610 is configured to implement functions such as system management, device maintenance, and protocol processing. The switching board 620 is configured to complete data exchange between the interface boards (the interface board is also referred to as a line card or a service board). The interface board 630 and the interface board 640 are configured to provide various service interfaces (for example, an Ethernet interface and a POS interface), and implement packet forwarding. The main control board 610, the interface board 630, the interface board 640, and the switching board 620 are connected to a system backplane through a system bus to implement interworking. A central processing unit 631 on the interface board 630 is configured to control and manage the interface board and communicate with a central processing unit 611 on the main control board 610.

The SF receives, from a physical interface card 633, a second packet sent by an SFF, where the second packet includes cache index information but does not include an SR header. The physical interface card 633 sends the second packet to a network processor 632. The network processor 632 queries a forwarding entry memory 634 based on the second packet, and a matching result indicates that the packet is a local packet. Therefore, the network processor 632 sends the second packet to the central processing unit 611 on a control plane. The central processing unit 611 on the main control board 610 may perform S305 in Embodiment 1 shown in FIG. 3. The physical interface card 633 and the network processor 632 may perform S306 in Embodiment 1 shown in FIG. 3. Reference may be made to the foregoing related descriptions, and details are not described herein again.

It should be understood that an operation on the interface board 640 is the similar to an operation on the interface board 630 in this embodiment. For brevity, details are not described again. It should be understood that there may be one or more main control boards, and in a case of a plurality of main control boards, there may be an active main control board and a standby main control board. There may be one or more interface boards, and there may also be one or more physical interface cards on the interface board. There may be no switching board, or there may be one or more switching boards. A specific architecture to be used depends on a specific networking deployment scenario. This is not limited herein.

Figure 16:
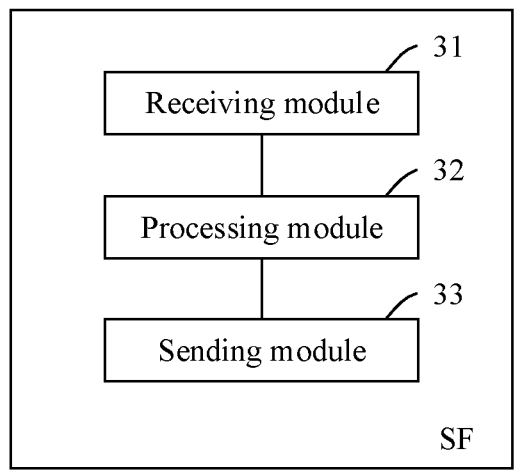
FIG. 16 is a schematic structural diagram of an SF according to Embodiment 2.

FIG. 16 is a schematic structural diagram of an SF according to Embodiment 2. The SF provided in this embodiment may perform operations performed by the SF in the embodiments shown in FIG. 3 to FIG. 11. As shown in FIG. 16, the SF provided in this embodiment may include: a receiving module 31 configured to receive a first packet sent by an SFF, where the first packet includes cache index information; a processing module 32 configured to generate a response packet based on the first packet, where the response packet includes the cache index information; and a sending module 33 configured to send the response packet to the SFF.

Optionally, the cache index information is used to indicate to enable the SF to add the cache index information to the response packet.

Optionally, the response packet further includes identification information, and the identification information is used to indicate to enable the SF to add the cache index information to the response packet.

Optionally, the response packet includes a packet header, the packet header includes a content field, and the content field is used to carry the cache index information.

Optionally, the response packet includes a packet header, the packet header includes an identifier field, and the identifier field is used to carry the identification information.

Optionally, the processing module 32 is further configured to: determine whether the SF is enabled, at a current moment, to add the cache index information to the response packet; and if the SF is enabled, at the current moment, to add the cache index information to the response packet, perform the step of generating the response packet based on the first packet.

Optionally, the receiving module 31 is further configured to: receive configuration information, where the configuration information is used to enable the SF to add the cache index information to the response packet.

The SF provided in this embodiment is configured to perform operations performed by the SF in the embodiments shown in FIG. 3 to FIG. 11. Technical principles and technical effects are similar, and details are not described herein again.

Figure 17:
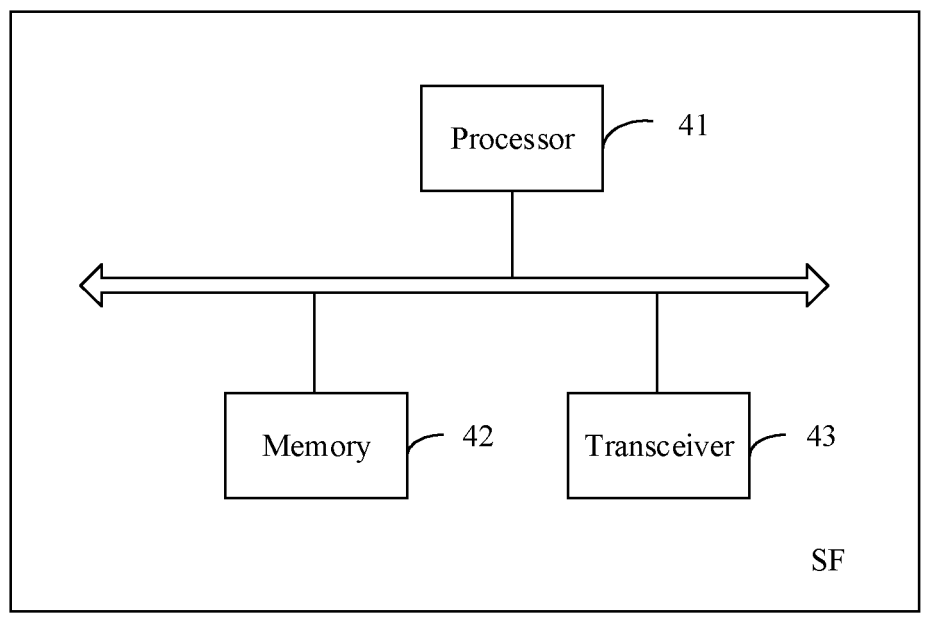
FIG. 17 is a schematic structural diagram of an SF according to Embodiment 3.

FIG. 17 is a schematic structural diagram of an SF according to Embodiment 3. As shown in FIG. 17, the SF provided in this embodiment may include a processor 41, a memory 42, and a transceiver 43. The transceiver 43 is configured to receive or send data. The memory 42 is configured to store instructions. The processor 41 is configured to execute the instructions stored in the memory 42, to perform operations performed by the SF in the embodiments shown in FIG. 3 to FIG. 11.

The SF provided in this embodiment is configured to perform operations performed by the SF in the embodiments shown in FIG. 3 to FIG. 11. Technical principles and technical effects are similar, and details are not described herein again.

An embodiment further provides a packet transmission system, including the SFF provided in the embodiment shown in FIG. 12 and the SF provided in the embodiment shown in FIG. 15; or includes the SFF provided in the embodiment shown in FIG. 13 and the SF provided in the embodiment shown in FIG. 16; or includes the SFF provided in the embodiment shown in FIG. 14 and the SF provided in the embodiment shown in FIG. 17.

It should be understood that division into the modules in the foregoing apparatus is merely logical function division. During actual implementation, some or all of the modules may be integrated into one physical entity, or may be physically separated. In addition, all these modules may be implemented in a form of software invoked by a processing element, or may be implemented in a form of hardware. Alternatively, some modules may be implemented in a form of software invoked by a processing element, and some modules are implemented in a form of hardware. For example, a processing module may be an independently disposed processing element, or may be integrated into a chip of the foregoing apparatus. In addition, the processing module may be stored in a memory of the foregoing apparatus in a form of program code, and is invoked by a processing element of the foregoing apparatus to perform a function of the foregoing processing module. Implementations of other modules are similar. In addition, all or some of these modules may be integrated together, or may be implemented independently. The processing element described herein may be an integrated circuit with a signal processing capability. In an implementation process, steps in the foregoing methods or the foregoing modules can be implemented by using a hardware integrated logical circuit in the processor element, or by using instructions in a form of software.

For example, the foregoing modules may be configured as one or more integrated circuits implementing the foregoing methods, for example, one or more application-specific integrated circuits (ASICs), one or more digital signal processors (DSPs), or one or more field-programmable gate arrays (FPGAs). For another example, when one of the foregoing modules is implemented in a form of scheduling program code by a processing element, the processing element may be a general purpose processor, for example, a central processing unit (CPU) or another processor that can invoke the program code. For still another example, the modules may be integrated together and implemented in a form of a system-on-a-chip (SOC).

In the embodiments, the processor may be a general purpose processor, a digital signal processor, an ASIC, an FPGA or another programmable logic device, a discrete gate or transistor logic device, or a discrete hardware component, and may implement or execute the methods, steps, and logical block diagrams disclosed in the embodiments. The general purpose processor may be a microprocessor or any conventional processor or the like. The steps of the methods disclosed with reference to the embodiments may be directly performed and completed by a hardware processor, or may be performed and completed by a combination of hardware in the processor and a software module.

In the embodiments, the memory may be a non-volatile memory, such as a hard disk drive (HDD) or a solid-state drive (SSD), or may be a volatile memory, such as a random-access memory (RAM). The memory is any medium that can carry or store expected program code in a form of an instruction or a data structure and that can be accessed by a computer, but is not limited thereto. The memory in the embodiments may alternatively be a circuit or any other apparatus that can implement a storage function, and is configured to store a program instruction and/or data.

It may be understood that various numbers in the embodiments are merely used for differentiation for ease of description, and are not used to limit the scope of the embodiments.

It may be understood that in the embodiments, sequence numbers of the foregoing processes do not mean execution sequences. The execution sequences of the processes should be determined based on functions and internal logic of the processes, and should not be construed as any limitation on the implementation processes of the embodiments.

What is claimed is:

1. A method implemented by a first network device and comprising:
   receiving, from a previous-hop device of the first network device, a first packet comprising a segment routing (SR) header;
   generating cache index information of the SR header;
   storing the cache index information and the SR header;
   generating a second packet based on the first packet, wherein the second packet comprises the cache index information but does not comprise the SR header; and
   sending, to a second network device, the second packet.

2. The method of claim 1, wherein the cache index information instructs the first network device to add the cache index information to the second packet.

3. The method of claim 1, wherein the second packet further comprises identification information instructing the first network device to add the cache index information to the second packet.

4. The method of claim 3, wherein the second packet comprises a packet header, wherein the packet header comprises an identifier field, and wherein the identifier field comprises the identification information.

5. The method of claim 1, further comprising:
   obtaining N-tuple information from the first packet, wherein the N-tuple information indicates a data flow to which the first packet belongs, and wherein N is an integer greater than 0; and
   further generating the cache index information based on the N-tuple information.

6. The method of claim 1, further comprising:
   receiving, from the second network device in response to the second packet, a response packet comprising the cache index information;
   obtaining, based on the cache index information, an SR header that corresponds to the cache index information and that is stored in the first network device;
   generating, based on the response packet, a third packet comprising the SR header; and
   sending, to a next-hop device of the first network device, the third packet.

7. The method of claim 1, wherein before receiving the first packet, the method further comprises obtaining configuration information enabling the first network device to add the cache index information to the second packet.

8. The method of claim 1, wherein the second packet comprises a packet header, wherein the packet header comprises a content field, and wherein the content field comprises the cache index information.

9. A method implemented by a second network device and comprising:
   receiving, from a first network device, a packet comprising cache index information;
   generating, based on the packet, a response packet comprising the cache index information; and
   sending, to the first network device, the response packet.

10. The method of claim 9, wherein the cache index information instructs the second network device to add the cache index information to the response packet.

11. The method of claim 9, wherein the response packet further comprises identification information instructing the second network device to add the cache index information to the response packet.

12. The method of claim 11, wherein the response packet comprises a packet header, wherein the packet header comprises an identifier field, and wherein the identifier field comprises the identification information.

13. The method of claim 9, wherein the response packet comprises a packet header, wherein the packet header comprises a content field, and wherein the content field comprises the cache index information.

14. The method of claim 9, further comprising receiving configuration information enabling the second network device to add the cache index information to the response packet.

15. A first network device comprising:
a transceiver configured to:
receive, from a previous-hop device of the first network device, a first packet comprising a segment routing (SR) header; and
send a second packet to a second network device; and
a processor coupled to the transceiver and configured to:
generate cache index information of the SR header;
store the cache index information and the SR header; and
generate the second packet based on the first packet, wherein the second packet comprises the cache index information but does not comprise the SR header.

16. The first network device of claim 15, wherein the cache index information instructs the first network device to add the cache index information to the second packet.

17. The first network device of claim 15, wherein the second packet further comprises identification information instructing the first network device to add the cache index information to the second packet.

18. The first network device of claim 15, wherein the processor is further configured to:
obtain N-tuple information from the first packet, wherein the N-tuple information indicates a data flow to which the first packet belongs, and wherein N is an integer greater than 0; and
further generate the cache index information based on the N-tuple information.

19. The first network device of claim 15, wherein the transceiver is further configured to:
receive, from the second network device in response to the second packet, a response packet comprising the cache index information; and
send, to a next-hop device of the first network device, a third packet,
wherein the processor is further configured to:
obtain, based on the cache index information, an SR header that corresponds to the cache index information and that is stored in the first network device; and
generate, based on the response packet for the second packet, the third packet, and wherein the third packet comprises the SR header.

20. The first network device of claim 15, wherein before receiving the first packet, the transceiver is further configured to obtain configuration information enabling the first network device to add the cache index information to the second packet.

* * * * *